(12) United States Patent
Nakamura et al.

(10) Patent No.: US 8,693,801 B2
(45) Date of Patent: Apr. 8, 2014

(54) IMAGE PROCESSING DEVICE, IMAGE PROCESSING METHOD, AND INTEGRATED CIRCUIT

(75) Inventors: Tsuyoshi Nakamura, Fukuoka (JP); Tadanori Tezuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 137 days.

(21) Appl. No.: 13/512,190

(22) PCT Filed: Sep. 15, 2011

(86) PCT No.: PCT/JP2011/005202
§ 371 (c)(1),
(2), (4) Date: May 25, 2012

(87) PCT Pub. No.: WO2012/042771
PCT Pub. Date: Apr. 5, 2012

(65) Prior Publication Data
US 2012/0288194 A1 Nov. 15, 2012

(30) Foreign Application Priority Data
Sep. 28, 2010 (JP) .................................. 2010-216394

(51) Int. Cl.
*G06K 9/40* (2006.01)
*G06T 5/00* (2006.01)
*H04N 1/409* (2006.01)
*G06T 5/20* (2006.01)

(52) U.S. Cl.
CPC .............. *G06T 5/002* (2013.01); *H04N 1/4092* (2013.01); *G06T 5/20* (2013.01); *G06T 2207/20192* (2013.01)
USPC ............................ 382/264; 382/260; 382/261

(58) Field of Classification Search
None
See application file for complete search history.

(56) References Cited

U.S. PATENT DOCUMENTS 7,657,114 B2 * 2/2010 Moon et al. ................... 382/260
(Continued)

FOREIGN PATENT DOCUMENTS

JP 2006/060744 3/2006
(Continued)

OTHER PUBLICATIONS

Abbas, H.; Karam, L.J., "Suppression of Mosquito Noise by Recursive Epsilon-Filters," Acoustics, Speech and Signal Processing, 2007. ICASSP 2007. IEEE International Conference on , vol. 1, no., pp. I-773,I-776, Apr. 15-20, 2007.*

(Continued)

*Primary Examiner* — Li Liu
(74) *Attorney, Agent, or Firm* — Wenderoth, Lind & Ponack, L.L.P.

(57) ABSTRACT

Provided is an image processing device capable of performing appropriate noise reduction without causing blurring of edges and details of the image. The image processing device: specifies, on a normal distribution representing a noise model of the image, a reference range having a value of a target pixel as a median; computes, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median; corrects one of the first sub-range and the second sub-range so that one of the sub-ranges in which a fewer number of pixels are distributed than in the other sub-range is narrower relative to the other sub-range; determines a selection range that is composed of the one of the first sub-range and the second sub-range as corrected and the other one of the first sub-range and the second sub-range as is; and performs noise reduction on an image region subjected to noise reduction and at least containing the local region by using values falling within the selection range from among the values of the respective pixels contained in the target region.

10 Claims, 20 Drawing Sheets

(56) References Cited

U.S. PATENT DOCUMENTS

| | | | |
|---|---|---|---|
| 8,320,697 B2* | 11/2012 | Watarai | 382/261 |
| 2007/0071355 A1 | 3/2007 | Imai | |
| 2008/0144960 A1* | 6/2008 | Watarai | 382/260 |
| 2009/0060323 A1 | 3/2009 | Aragaki et al. | |
| 2009/0141149 A1 | 6/2009 | Zhang et al. | |
| 2011/0069903 A1* | 3/2011 | Oshikiri | 382/264 |
| 2012/0070099 A1* | 3/2012 | Wada et al. | 382/266 |
| 2012/0147226 A1* | 6/2012 | Takatori | 348/246 |
| 2012/0169894 A1* | 7/2012 | Numata et al. | 348/208.99 |

FOREIGN PATENT DOCUMENTS

| | | |
|---|---|---|
| JP | 2007-096509 | 4/2007 |
| JP | 2009/077393 | 4/2009 |
| JP | 2009-111541 | 5/2009 |
| WO | 2009/081709 | 7/2009 |

OTHER PUBLICATIONS

International Search Report issued Dec. 13, 2011 in corresponding International (PCT) Application No. PCT/JP2011/005202.
"Informal Comments" filed Jan. 25, 2012 in corresponding International (PCT) Application No. PCT/JP2011/005202.

* cited by examiner

IMAGE PROCESSING DEVICE, IMAGE PROCESSING METHOD, AND INTEGRATED CIRCUIT

TECHNICAL FIELD

The present invention relates to technology of noise reduction in image processing.

BACKGROUND ART

Conventionally, $\epsilon$ filters are known as a scheme to reduce noise from image signals with a simple structure. An $\epsilon$ filter is to apply a mean filter to each pixel that is located in an image region subjected to image reduction and that has a pixel value falling within a range determined by a certain threshold $\epsilon$.

Generally, the noise model is represented as shown in FIG. 22A, by a standard deviation (normal distribution) corresponding to the image signal level. For example, when a mean filter is applied, the pixel value x of the target pixel is corrected by using pixel values falling within the range of $x \pm \epsilon$ (see FIG. 22B). To obtain a sufficient noise reduction effect, it is important to increase the number of pixel values falling within the range of $x \pm \epsilon$. That is, unless the threshold $\pm \epsilon$ is given an appropriate value, the $\epsilon$ filter cannot offer a sufficient noise reduction effect or may result in blurring of edges and details of the image.

Patent Literature 1 discloses a structure for determining an appropriate threshold $\pm \epsilon$ by controlling the threshold of $\epsilon$ filter according to the chroma or color level of an image signal. Patent Literature 2 discloses a structure for controlling the threshold of $\epsilon$ filter according to a noise model obtained by analyzing input image signal.

CITATION LIST

Patent Literature

[Patent Literature 1]
  Japanese Patent Application Publication No. 2006-60744
[Patent Literature 2]
  Japanese Patent Application Publication No. 2009-111541

SUMMARY OF INVENTION

Technical Problem

With an $\epsilon$ filter, the number of pixels used in filtering will increase at a higher possibility for a larger integral of the probability density defined for an interval $x \pm \epsilon$. In the meantime, the integral of the probability density for the interval $x \pm \epsilon$, or equivalently the size of the diagonally shaded area, is greater in FIG. 22B than in FIG. 22C, which means that the number of pixels used in filtering is greater in FIG. 22B. In the case where the pixel value x of a target pixel corresponds to a location near an end of the normal distribution curve as shown in FIG. 22C, the threshold $\epsilon$ may be adjusted to be larger thereby to increase the integral of the probability density. However, such adjustment increases the risk of selecting pixels on edges or small details of an image, which may result in blurred edges or details. In the case where the pixel value x corresponds to such a location on the normal distribution curve as shown in FIG. 22C, the pixel having that pixel value is assumed to appear inside an object near a boundary (edge) with another object in an image. It is because the pixel value x of a pixel inside an object normally is close to the median of the normal distribution, unless affected by the pixel values of pixels inside another object. In the case where the pixel value x corresponds to such a location as shown in FIG. 22C, the corresponding pixel is largely affected by pixels of another object although the threshold $\epsilon$ is not changed. Therefore, there is a risk of blurred edges or details.

In view of the above problems, the present invention aims to provide an image processing device, an image processing method, and an integrated circuit each of which is capable of appropriate noise processing while preventing blurring of edges and details of the image.

Solution to Problem

In order to achieve the above aim, the present invention provides an image processing device for correcting pixel values of an image to reduce noise in the image. The image processing device includes a determination unit and a generating unit. The determination unit is configured to: specify, on a normal distribution representing a noise model of the image, a reference range having a value of a target pixel as a median; compute, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median; correct one of the first sub-range and the second sub-range so that one of the sub-ranges in which a fewer number of pixels are distributed than in the other sub-range is narrower relative to the other sub-range; and determine a selection range that is composed of the one of the first sub-range and the second sub-range as corrected and the other one of the first sub-range and the second sub-range as is. The generating unit is configured to generate a corrected value for the target pixel by correcting values of pixels contained in a target region to reduce noise, the target region being an image region subjected to noise reduction and at least containing the local region, and the value correction involving use of values falling within the selection range from among the values of the respective pixels contained in the target region.

Advantageous Effects of Invention

With the structure described above, the image processing device corrects the reference range having the pixel value of the target pixel as the median, so that one of the first sub-range and the second sub-range of the reference range is made narrower relative to the other sub-range, depending on the number of pixel values falling within the respective sub-ranges. This range correction reduces the possibilities of selecting pixels affected by pixels of another object, i.e., pixels corresponding to edges or details, for noise reduction processing. Consequently, noise is reduced without causing blurring of edges and details.

BRIEF DESCRIPTION OF DRAWINGS

FIG. 12A is a plot showing the relationship between smoothness level and gain, whereas

FIG. 19A is a plot showing the relationship between blue color difference component and red color difference component included in an output image signal, whereas

DESCRIPTION OF EMBODIMENTS

The following describes embodiments of the present invention with reference to the accompanying drawings.

1. First Embodiment

First, the following describes a first embodiment of the present invention with reference to the accompanying drawings.

1.1 Structure of Image Processing Device 10

Figure 1:
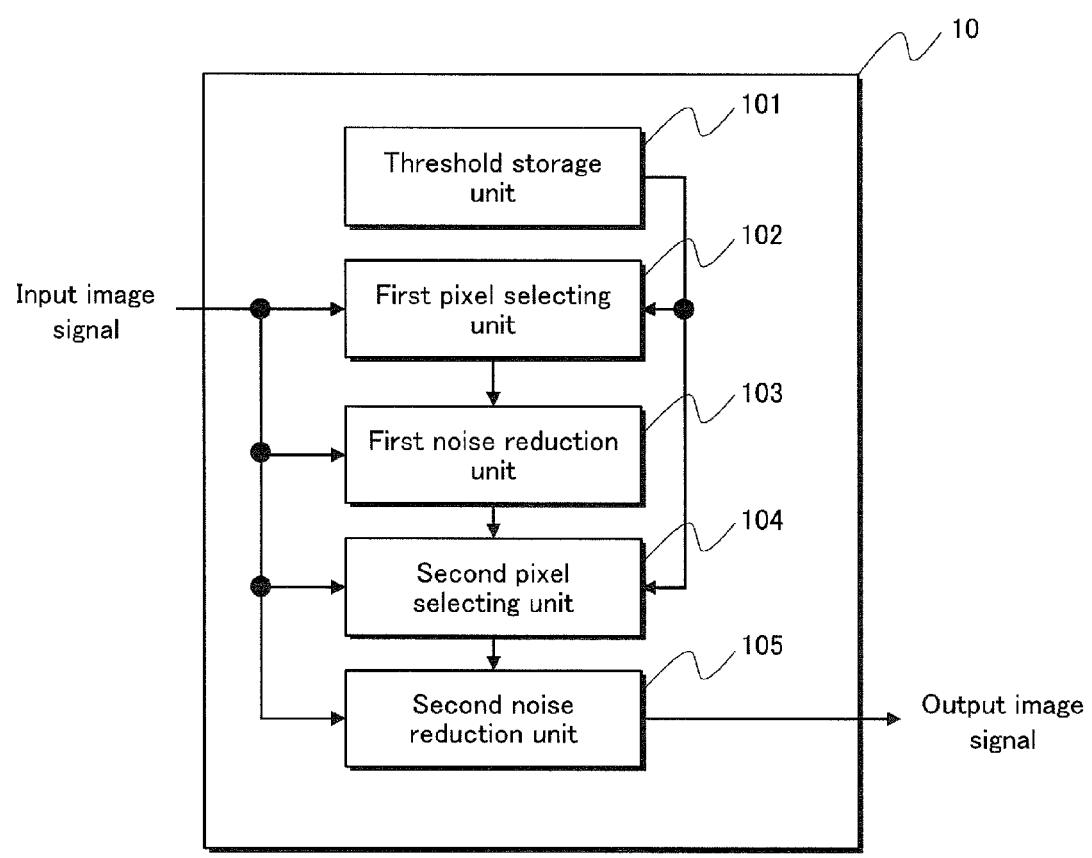
FIG. 1 is a block diagram showing the structure of an image processing device 10.

As shown in FIG. 1, an image processing device 10 includes a threshold storage unit 101, a first pixel selecting unit 102, a first noise reduction unit 103, a second pixel selecting unit 104, and a second noise reduction unit 105.

(1) Threshold Storage Unit 101

Figure 2:
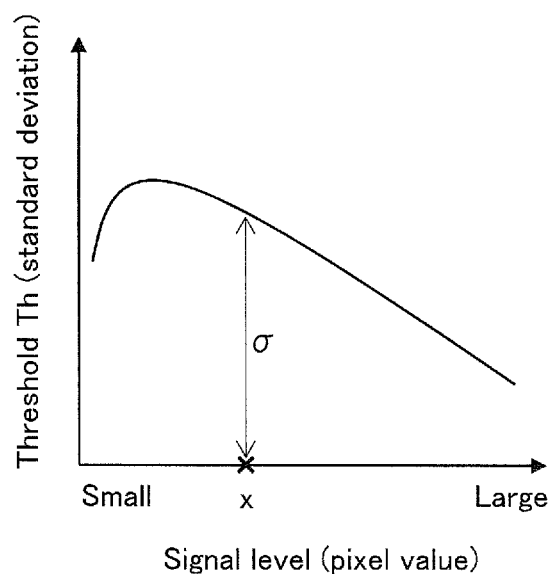
FIG. 2 is a plot showing the relationship between a signal level and standard deviation (threshold Th).

As shown in FIG. 2, the threshold storage unit 101 stores a threshold Th (standard deviation) that varies according to the level of an image signal (pixel value x). Note that the pixel value x ranges from 0 to 255.

For example, the threshold Th represents the standard deviation or dispersion corresponding to the level of an image signal affected by various random noise components involved in the image sensor, such as dark-current shot noise, photon shot noise, reset noise of floating diffusion (hereinafter "FD"), and FD amplifier noise.

(2) First Pixel Selecting Unit 102

The first pixel selecting unit 102 calibrates the threshold Th acquired from the threshold storage unit 101 by applying a predetermined gain based on the level of the input image signal.

Figure 3:
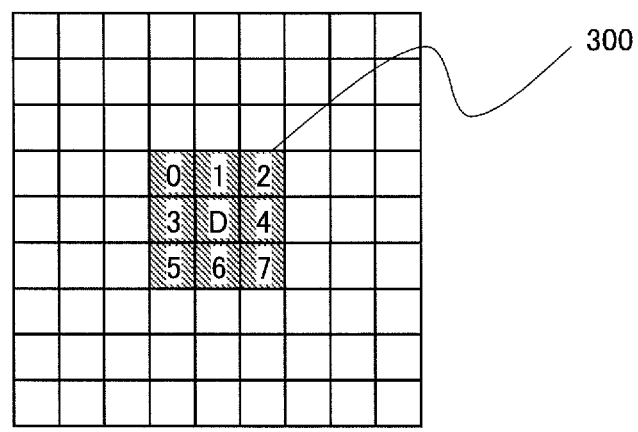
FIG. 3 is a view showing a pixel region 300 subjected to processing by a first pixel selecting unit.

More specifically, the first pixel selecting unit 102 acquires the threshold Th corresponding to the pixel value of the target pixel D shown in FIG. 3 from the threshold storage unit 101, and multiplies the thus acquired threshold Th by a predetermined gain (value of "3", for example). Then, for each of the pixels (pixels 0-7 in FIG. 3) in the 3×3 pixel region (local region) 300 surrounding the target pixel, the first pixel selecting unit 102 estimates whether the pixel value exceeds the signal level at which the probability density is highest in the normal distribution having the pixel value of the target pixel D as the mean, and the threshold Th as a deviation. The first pixel selecting unit 102 then calibrates the threshold Th acquired from the threshold storage unit 101, based on the estimation results to determine thresholds Th1L and Th1U. Then, if the pixel value of each pixel contained in the 5×5 pixel region 400 surrounding the target pixel D shown in FIG. 4 falls within the range from (x−Th1L) to (x+Th1U), the first pixel selecting unit 102 outputs a selection signal indicating that the corresponding image signal input to the first noise reduction unit 103 is valid. Note that the value x is the pixel value of the target pixel D.

(3) First Noise Reduction Unit 103

From among the pixel values of the pixels contend in the pixel region 400 surrounding the target pixel D, the first noise reduction unit 103 acquires only pixel values falling within the range from (x−Th1L) to (x+Th1U) according to the selection signals output by the first pixel selecting unit 102, applies filtering to the thus acquired pixel values, and outputs the result to the second pixel selecting unit 104.

Figure 4:
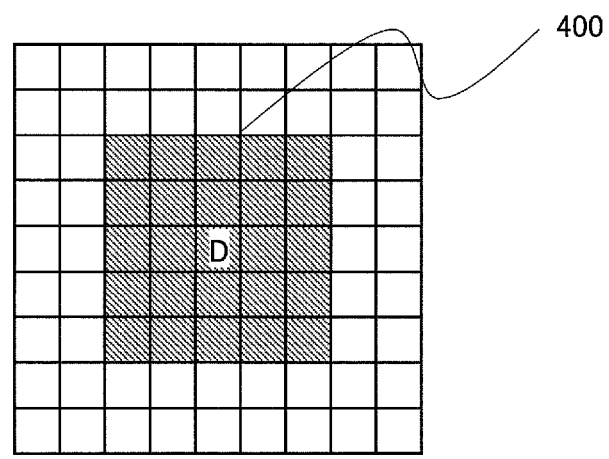
FIG. 4 is a view showing a pixel region 400 subjected to processing by a first noise reduction unit.
Figure 5:
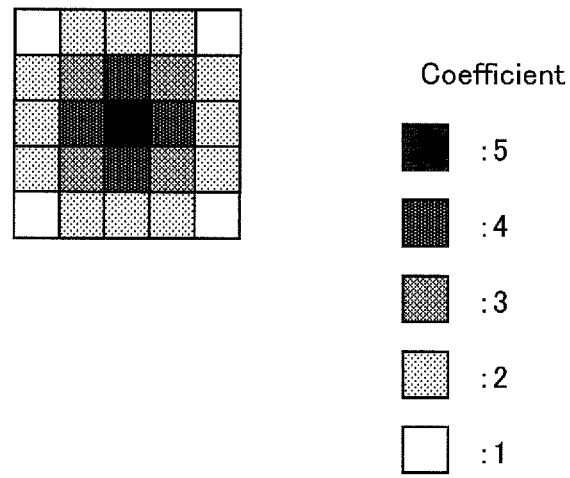
FIG. 5 is a view showing one example of a set of filter coefficients used by the first noise reduction unit.

More specifically, the first noise reduction unit 103 extracts, according to the selection signals, pixel values falling within the range of (x−Th1L) and (x+Th1U) from the pixel values of the pixels contained in the pixel region 400 of the surrounding target pixel D as shown in FIG. 4, and carries out the filtering of the thus extracted pixel values by weighted averaging with the coefficients shown in FIG. 5 (represented by the gradation levels). The resulting data is then output to the second pixel selecting unit 104. In one example, each gradation level is associated with one of coefficients 1 to 5 as shown in FIG. 5. The noise reduction (weighted averaging) is carried out on the pixel region 400 by using the coefficients and the corresponding gradation levels (pixel values).

(4) Second Pixel Selecting Unit 104

The second pixel selecting unit 104 applies the predetermined gain to the threshold Th' acquired from the threshold storage unit 101, based on the data resulting from the processing by the first noise reduction unit 103. As a result, the threshold Th' is calibrated.

Figure 6:
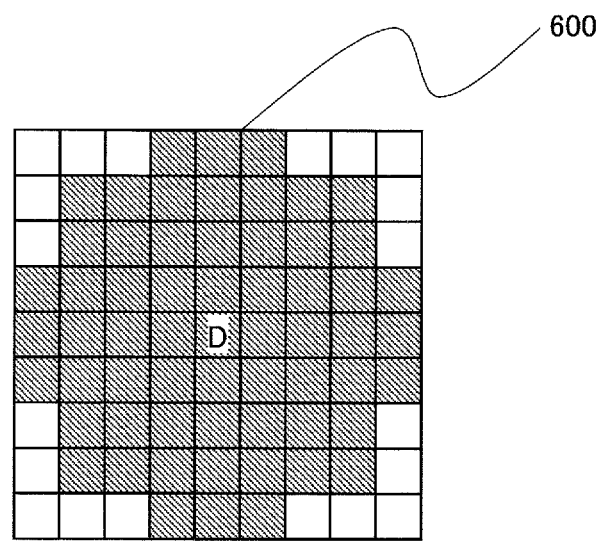
FIG. 6 is a view showing a pixel region 600 subjected to processing by a second noise reduction unit.

More specifically, the second pixel selecting unit 104 acquires the threshold Th' corresponding to the data resulting from the processing by the first noise reduction unit 103 (i.e., the noise reduced pixel value x' of the target pixel D) from the threshold storage unit 101, and multiples the thus acquired threshold Th' by a smaller gain (value "2.5", for example) than the gain having been applied by the first pixel selecting unit 102. The second pixel selecting unit 104 calibrates the threshold Th' to determine thresholds Th2L and Th2U by using an estimation method similar to that used in the first pixel selecting unit 102. In the calibration by the second pixel selecting unit 104, the pixel region subjected to processing is a pixel region 600 defined relatively to a 9×9 pixel region surrounding the target pixel D as shown in FIG. 6. As can be seen, the pixel region 600 is larger than the pixel region 400 processed by the first noise reduction unit 103. If the pixel value of each pixel contained in the pixel region 600 defined relatively to the 9×9 pixel region falls within the range from (x'−Th2L) to (x'+Th2U), the second pixel selecting unit 104 outputs a selection signal indicating that the corresponding image signal to be input to the second noise reduction unit 105 is valid. Note that the value x' is the noise reduced pixel value of the target pixel D obtained through the processing by the first noise reduction unit 103.

(5) Second Noise Reduction Unit 105

On receiving an input image signal, the second noise reduction unit 105 acquires pixel values falling within the range from (x'−Th2L) to (x'+Th2U) from among the pixel values of the pixels in the pixel region 600 containing the target pixel D, according to the selection signals output by the second pixel selecting unit 104, applies filtering to the thus acquired pixel values, and produces an output image signal.

More specifically, the second noise reduction unit 105 extracts pixel values falling within the range from (x'−Th2L) to (x'+Th2U) from among the pixel values of the pixels contained in the pixel region 600 which generally has the shape of a circle inscribed in the 9×9 pixel region surrounding the target pixel D, and applies a mean filter to the extracted pixels to obtain the output image signal. Note that the shape of the pixel region 600 shown in FIG. 6 may be rectangular (completely equal to the 9×9 pixel region, in this example) or oval, instead of circler.

1.2 Operations

The following describes operations of the image processing device 10.

(1) Overview

First, the overview of the processing by the image processing device 10 is described with reference to the flowchart shown in FIG. 7.

The first pixel selecting unit 102 performs processing for determining the thresholds Th1L and Th1U based on the pixel value x of the input pixel D (target pixel D shown in FIG. 3) to acquire the thresholds Th1L and Th1U (Step S5).

With respect to the pixels within the surrounding pixel region 400, the first noise reduction unit 103 applies noise reduction processing to each pixel having a pixel value falling within the range of (x−Th1L) to (x+Th1U) to obtain the noise reduced pixel value x' of the pixel D (Step S10).

The second pixel selecting unit 104 performs processing for determining thresholds Th2L and Th2U based on the noise reduced pixel value x' of the input pixel D to acquire the thresholds Th2L and Th2U (Step S15).

With respect to the pixels within the surrounding pixel region 600, the second noise reduction unit 105 applies noise reduction processing to each pixel having a pixel value falling within the range of (x'−Th2L) to (x'+Th2U) to obtain the output pixel value for the pixel D (Step S20).

(2) Processing for Determining Th1L and Th1U

Figure 7:
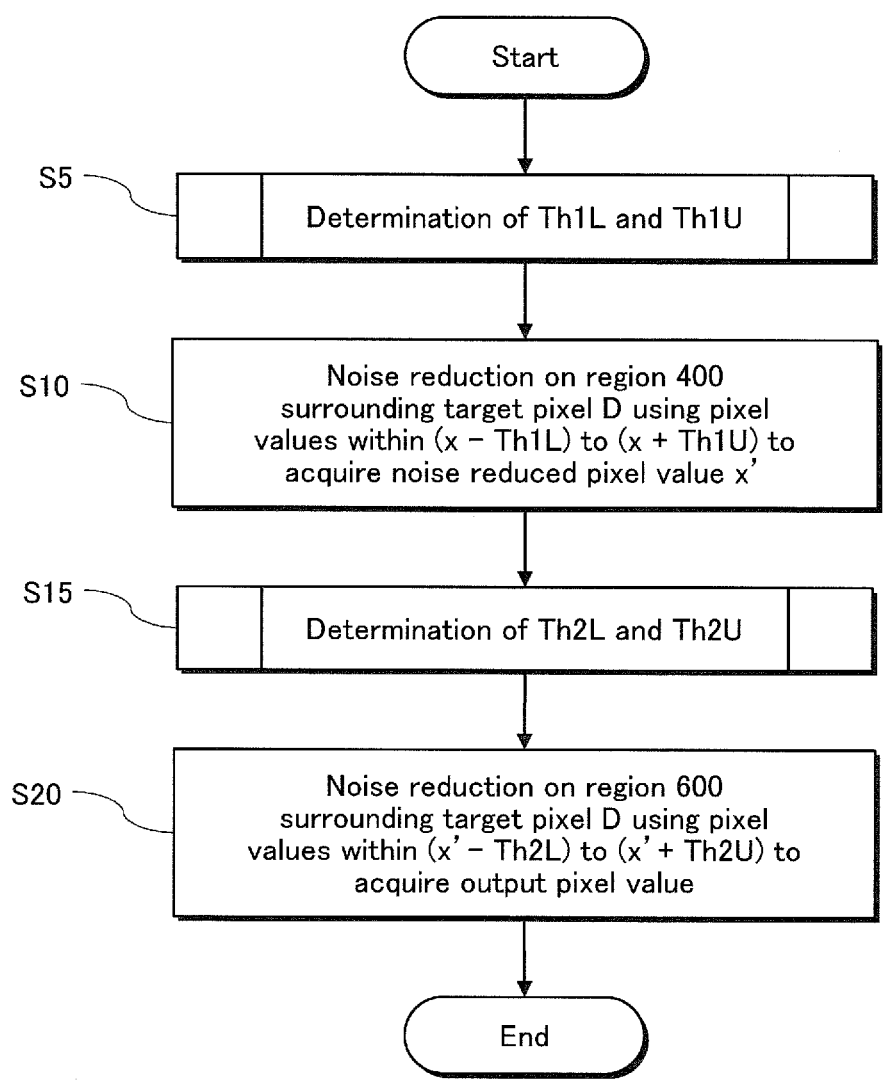
FIG. 7 is a flowchart showing operations of image processing performed by the image processing device 10.
Figure 8:
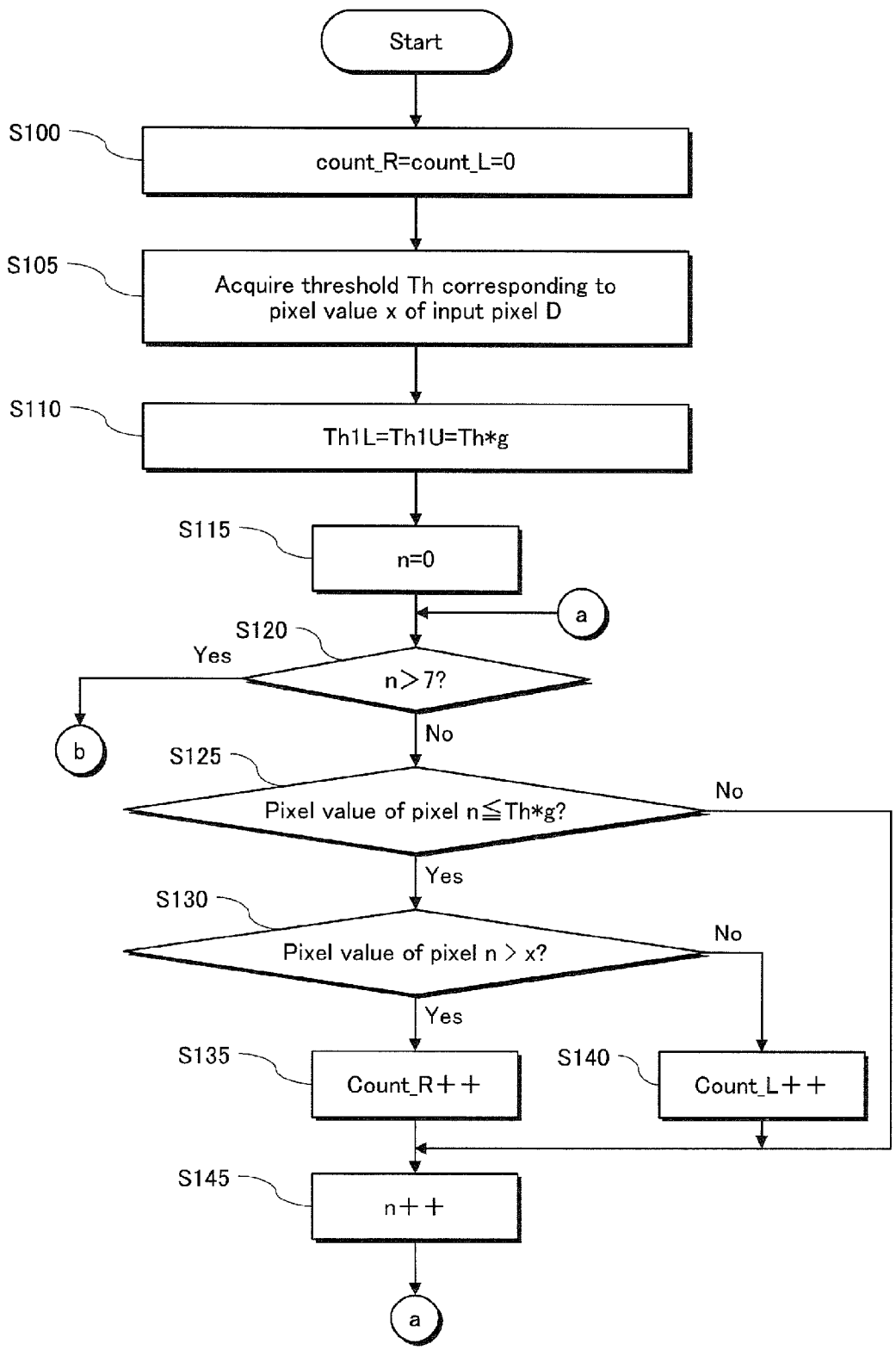
FIG. 8 is a flowchart showing operations of processing for determining Th1L and Th1U (continued to FIG. 9).

With reference to the flowchart shown in FIG. 8, the following describes the details of the processing for determining Th1L and Th1U performed in Step S5 shown in FIG. 7.

The first pixel selecting unit 102 initializes variables count_R and count_L to 0 (Step S100).

The first pixel selecting unit 102 acquires the threshold Th corresponding to the pixel value x of the input pixel D (Step S105) and multiplies the acquired threshold Th by a gain g and assigns the resulting value to Th1L and also to Th1U (Step S110).

To check the surrounding pixels 0-7 of the target pixel D shown in FIG. 3, the first pixel selecting unit 102 sets the variable n for specifying a surrounding pixel to 0 (Step S115).

The first pixel selecting unit 102 determines if the variable n is greater than 7, i.e., if the seven surrounding pixels have all been checked (Step S120).

When it is determined that the variable n is not greater than 7, i.e., that check of all the surrounding pixels has not been completed yet (Step S120: No), the first pixel selecting unit 102 determines whether or not the pixel value of the pixel n is equal to Th*g or smaller (Step S125).

When the pixel value of pixel n is determined to be equal to Th*g or smaller (Step S125: Yes), the first pixel selecting unit 102 determines whether or not the pixel value of the pixel n is greater than the pixel value x of the input pixel D (Step S130).

When determining the pixel value of the pixel n to be larger than the pixel value x of the input pixel D (Step S130: Yes), the first pixel selecting unit 102 increments the variable count_R by 1 (Step S135). When determining the pixel value of the pixel n not to be greater than the pixel value x of the input pixel D (Step S130: No), the first pixel selecting unit 102 increments the variable count_L by 1 (Step S140). Then, the first pixel selecting unit 102 increments the variable n by 1 (Step S145) and goes back to Step S120.

When determining the pixel value of the pixel n not to be equal to or smaller than Th*g (Step S125: No), the first pixel selecting unit 102 performs Step S145.

When determining the variable n to be greater than 7, i.e., that check of all the surrounding pixels has been completed (Step S 120: Yes), the first pixel selecting unit 102 calculates the difference diff between the variables count_R and count_L as well as the addition result total of the variables count_R and count_L (Step S150).

The first pixel selecting unit 102 then determines whether or not the value of difference diff is the predetermined value P0 or greater (Step S155).

When determining that the difference diff is equal to P0 or greater (Step S155: Yes), the first pixel selecting unit 102 multiples Th1L by a value α (Step S160). Note that the value of α is a positive number smaller than 1, and may be 0.8, for example.

When determining that diff is not equal to P0 or greater (Step S155: No), the first pixel selecting unit 102 then determines whether or not the difference diff is equal to the predetermined value P1 or smaller (Step S165).

When determining that diff is equal to P1 or smaller (Step S165: Yes), the first pixel selecting unit 102 multiples Th1U by a value β (Step S170). Note that the value of β is a positive number smaller than 1 and may be 0.8, for example.

When determining that diff is not equal to P1 or smaller (Step S165: No), the first pixel selecting unit 102 then determines whether or not the addition result total is equal to the predetermined value P2 or smaller (Step S175).

When determining that the addition result total is equal to P2 or smaller (Step S175: Yes), the first pixel selecting unit 102 multiples Th1L by a value γ0 and multiples Th1U by a value γ1 (Step S180). Note that the values of γ0 and γ1 are each a number greater than 1 and may be 1.2, for example.

(3) Processing for Determining Th2L and Th2U

The processing for determining Th2L and Th2U is the same as that for

Th1L and Th1U, except that the values g, P0, P1, P2, α, β, γ0 and γ1 used in the processing for determining Th1L and Th1 are changed to appropriate values and that the pixel value x' after the noise reduction is used. Thus, no further description is given here. Alternatively, it may be sufficient to change the value g only, while the other values P0, P1, P2, α, β, γ0, and γ1 are left unchanged.

In addition, in the processing for determining Th2L and Th2U, Steps S115 through S145 shown in FIG. 8 are repeated for each pixel contained in the 9×9 pixel region excluding the target pixel. That is to say, the variable n used in the processing for determining Th2L and Th2U takes a value ranging from 0 to 79. Therefore, the condition for the determination made in Step S120 is changed. More specifically, the determination is made to see if the variable n is equal to 80, i.e., a value greater than 79. If the value n is determined to be greater, the processing moves onto Step S150. If the variable n is determined to be 79 or smaller, the processing moves onto Step S125.

1.3 Modifications

The present invention is not limited to the specific embodiment described above. Various embodiments including the following may be made.

(1) In the embodiment described above, the threshold storage unit 101 may be realized by a unit of generating a linear interpolation signal based on a lookup table listing possible thresholds indexed by input signal levels or on a line graph associating input signal levels with possible thresholds.

(2) In the above embodiment, the first noise reduction unit 103 performs noise reduction by weighted averaging. However, the present invention is not limited to this.

The first noise reduction unit 103 may employ any other filtering such as Gaussian filter, $\epsilon$ filter, mean filter, median filter, bilateral filter, or a filter using wavelet transform.

(3) In the above embodiment, a 3×3 pixel region, a 5×5 pixel region, and a 9×9 pixel region are used as the pixel regions surrounding the target pixel D. However, these are described merely by way of examples and without limitations. For example, any M×N pixel region may be used (where each of M and N is an integer equal to 3 or greater).

(4) Any combination of the embodiment and mortifications still fall within the scope of the present invention.

1.4 Recapitulation

As has been described above, when a noise model is represented by a normal distribution and the pixel value of a target pixel D appears at the end of the distribution curve, the image processing device of the present embodiment adjusts one of the threshold ranges +Th1 and −Th1 that are determined with respect to the position at which the pixel value of the target pixel D, so that one of the threshold ranges +Th1 and −Th1 is made narrower than the other. Here, the threshold range adjusted to be narrower is the one located closer toward the end of the distribution curve from the position at which the value of the target pixel appears. As a result of this adjustment, excessive noise reduction or equivalently excessive smoothing at details and edges of an image is avoided, which enables the image processing device to carry out noise reduction without causing blurring of edges and details.

2. Second Embodiment

The following describes operations of an image processing device 1000 according to the second embodiment.

2.1 Structure

Figure 10:
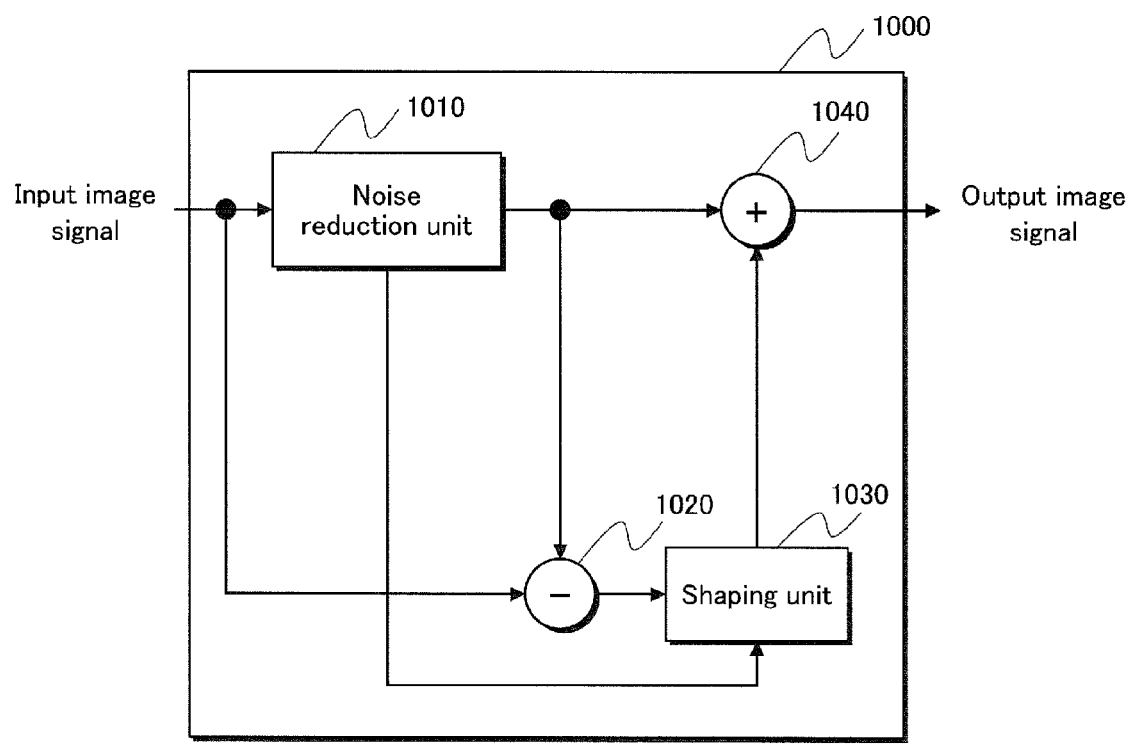
FIG. 10 is a block diagram showing the structure of an image processing device 1000.

As shown in FIG. 10, the image processing device 1000 includes a noise reduction unit 1010, a subtracter 1020, a shaping unit 1030, and an adder 1040.

(1) Noise Reduction Unit 1010

The noise reduction unit 1010 corresponds to the image processing device 10 described in the first embodiment.

Figure 11:
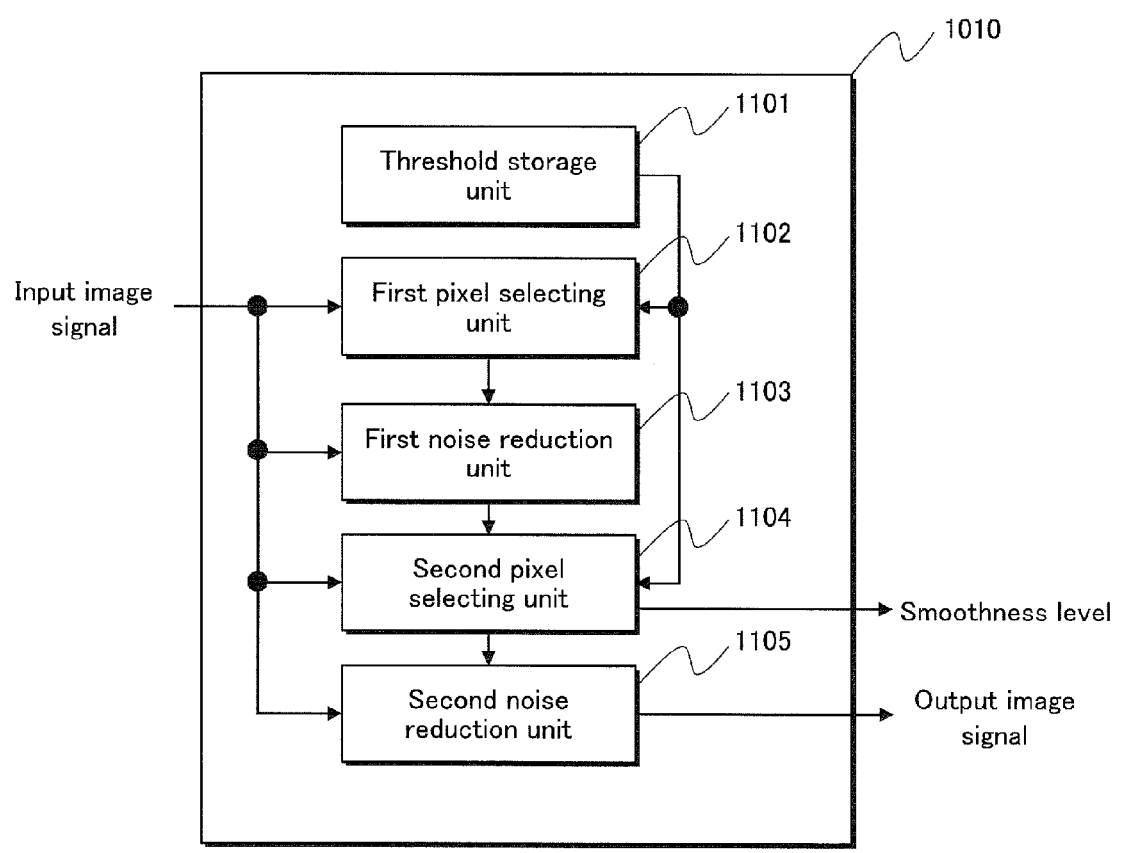
FIG. 11 is a block diagram showing the structure of a noise reduction unit 1010.

As shown in FIG. 11, the noise reduction unit 1010 includes a threshold storage unit 1101, a first pixel selecting unit 1102, a first noise reduction unit 1103, a second pixel selecting unit 1104, and a second noise reduction unit 1105.

Note that the first pixel selecting unit 1102, the first noise reduction unit 1103, and the second noise reduction unit 1105 are respectively the same as the first pixel selecting unit 102, the first noise reduction unit 103, and second noise reduction unit 105 according to the first embodiment. Therefore, no description thereof is given here. The following describes the threshold storage unit 1101 and the second pixel selecting unit 1104.

<Threshold Storage Unit 1101>

Similarly to the first embodiment, the threshold storage unit 1101 stores a threshold Th (standard deviation) that varies according to the level of an image signal (pixel value x) as shown in FIG. 2.

Figure 12A:
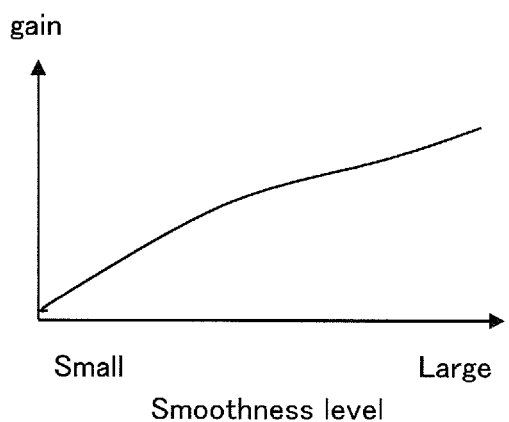
Figure 12B:
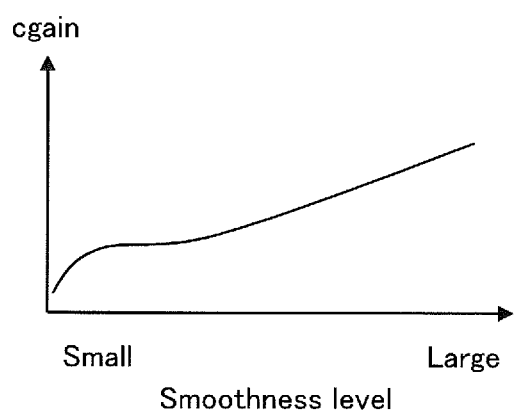
FIG. 12B is a plot showing the relationship between smoothness level and cgain.

In addition, the threshold storage unit 1101 stores thresholds gain and cgain each of which varies according to the smoothness level as shown in FIGS. 12A and 12B, respectively. The possible values of the thresholds gain and cgain ranges from 0 to 1. Note that the values shown FIGS. 12A and 12B may alternatively be found by linear interpolation from a lookup table listing possible thresholds indexed by smoothness levels or from a line graph associating smoothness levels with possible thresholds.

<Second Pixel Selecting Unit 1104>

The second pixel selecting unit 1104 has the following functions in addition to the same functions as the second pixel selecting unit 104 according to the first embodiment.

That is, the second pixel selecting unit 1104 outputs a signal indicating the smoothness level of an image (hereinafter, "smoothness signal") to the shaping unit 1030. The smoothness of an image indicates the degree to which the level of image signal fluctuates and is represented by the diffusion or deviation of the image signal input to the second pixel selecting unit 1104 or by the number of pixels indicated as valid by the selection signals output from the second pixel selecting unit 1104 to the second noise reduction unit 1105.

(2) Subtracter 1020

The subtracter 1020 computes noise components contained in the input image signal by subtracting, from the input image signal (pixel value), the image signal (pixel value) resulting from the noise reduction by the noise reduction unit 1010.

(3) Shaping Unit 1030

The shaping unit 1030 shapes the noise components based on the smoothness signal output by the noise reduction unit 1010.

The shaping unit 1030 acquires the thresholds gain and cgain corresponding to the smoothness level indicated by the smoothness signal.

A specific value (core) is determined in advance out of any values ranging from 0 to 255, and core value (cg) and a re-shape value (df) are also specified depending on the relation between the specific value (core) and noise components. The shaping unit 1030 multiples the core value cg by the thus obtained cgain and multiplies the re-shape value df by the thus obtained gain to compute add-on components to be added to the image signal resulting from the noise reduction.

Note that the core value refers to the smaller one of the noise component and the specific value (core), and the smaller one of the values is multiplied by cgain to carry out the calibration. On the other hand, the re-shape value refers to a value of excess noise components as compared to the value of core and is multiplied by gain to carry out the calibration.

(4) Adder 1040

The adder 1040 adds the add-on components acquired by the shaping unit 1030 to the output signal of the noise reduction unit 1010 and outputs the resulting data as the output image signal to the outside.

2.2 Operations

Figure 13:
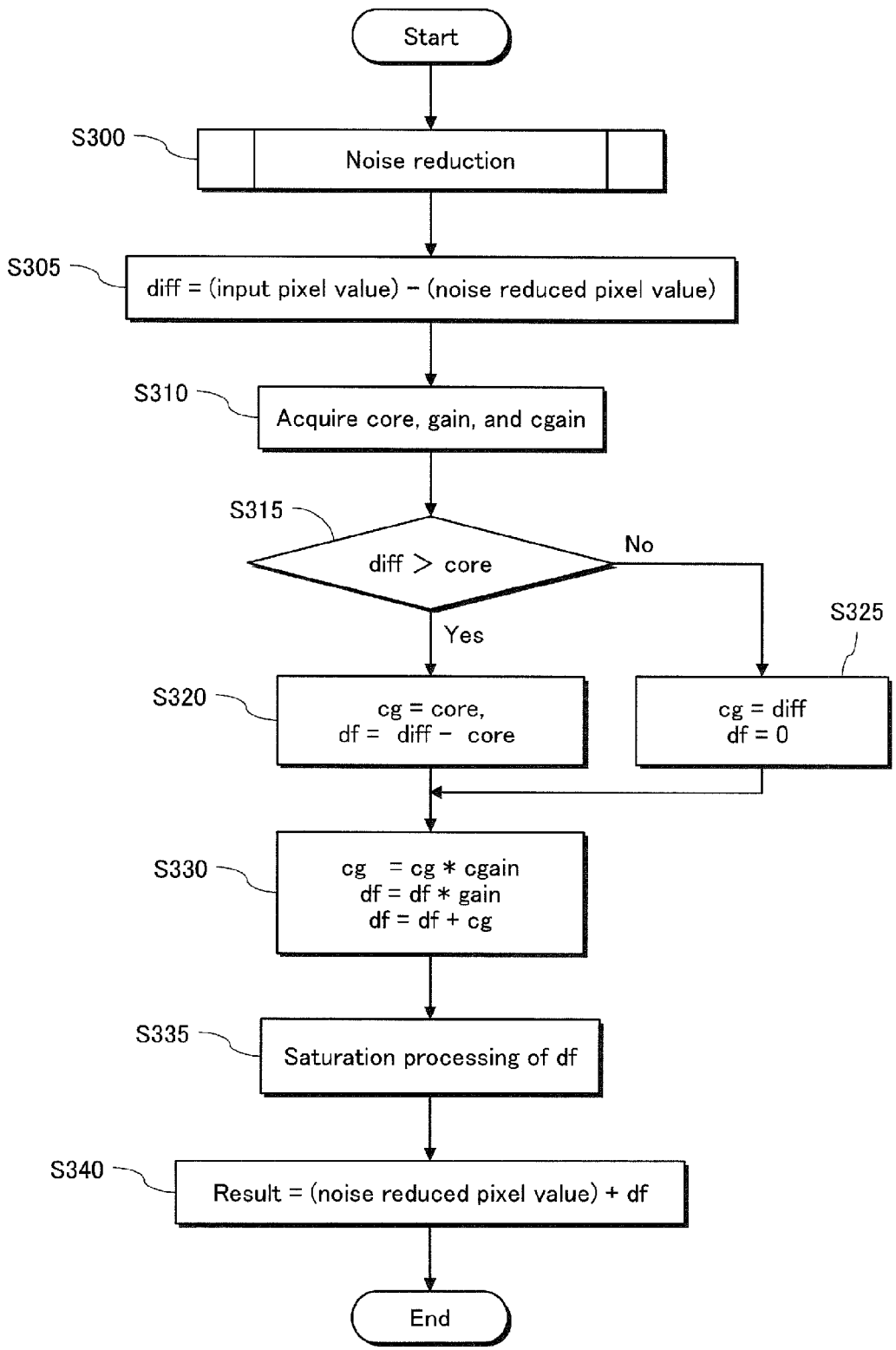
FIG. 13 is a flowchart showing operations of image processing performed by the image processing device 1000.

The following describes operations of the image processing device 1000, with reference to FIG. 13.

The noise reduction unit 1010 performs the noise reduction processing (Step S300). The noise reduction processing is the same as the processing shown in FIG. 7 and thus no description is given here.

The subtracter 1020 calculates the difference diff between the input image signal (input pixel value) and the noise reduced image signal (pixel value) that results from the noise reduction by the noise reduction unit 1010 (Step S305).

The shaping unit 1030 acquires gain and cgain based on the smoothness signal output by the noise reduction unit 1010 (Step S310). As shown by FIGS. 13A and 13B, the value of gain as well as the value of cgain varies according to the smoothness level. Note that the values shown FIGS. 13A and 13B may alternatively be found by linear interpolation from a lookup table listing possible thresholds indexed by flatness levels or from a line graph associating flatness levels with possible thresholds.

The shaping unit 1030 determines if the difference diff is greater than core (Step S315).

On determining that diff is greater than core (Step S315: Yes), the shaping unit 1030 assigns the value of core to the variable cg and the value obtained by computing "diff−core" to the variable df (Step S320). On the other hand, on determining that the difference diff is not greater than core, i.e., the difference diff is equal to core or smaller (Step S315: No), the shaping unit 1030 assigns the value of diff to the variable cg and "0" to the variable df (Step S325).

Then, the shaping unit 1030 assigns the computation result of "cg*cgain+df*gain" to the variable df (Step S330).

The shaping unit 1030 then performs saturation processing on the value of df obtained in Step S330 (Step S335). Note that saturation processing is a known technology in the art and thus no description is given here.

The adder 1040 adds the noise reduced pixel value to the variable df resulting from the saturation processing to obtain the pixel value to be output (Step S340).

2.3 Recapitulation

As described above, the image processing device of the present embodiment enables restoration of edges and details that are at the same level as noise components, by controlling the amount of noise represented by the difference between the input image and the noise reduced image.

3. Third Embodiment

The following describes operations of an image processing device 2000 according to the third embodiment.

3.1 Structure

Figure 14:
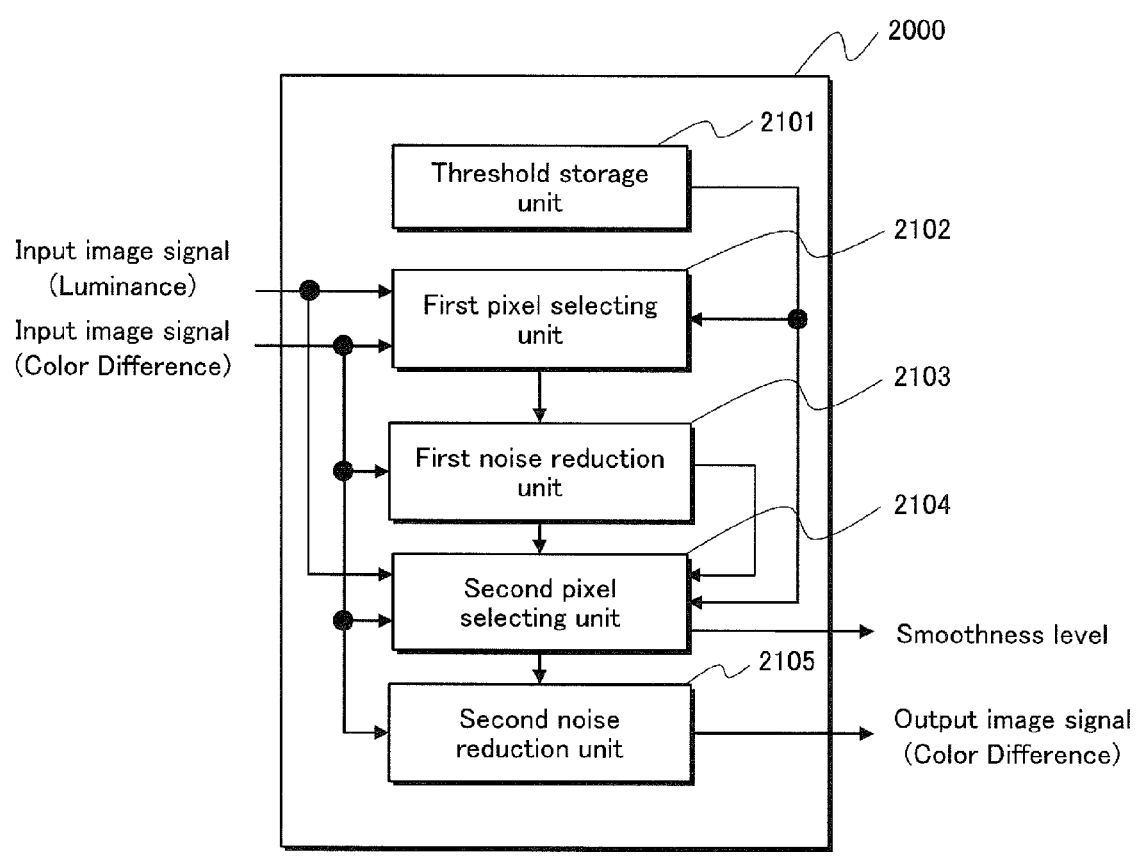
FIG. 14 is a block diagram showing the structure of an image processing device 2000.

As shown in FIG. 14, the image processing device 2000 includes a threshold storage unit 2101, a first pixel selecting unit 2102, a first noise reduction unit 2103, a second pixel selecting unit 2104, and a second noise reduction unit 2105.

(1) Threshold Storage Unit 2101

The threshold storage unit 2101 stores a threshold Th (standard deviation) that varies according to a level of an image signal (pixel value) indicating a luminance component of a pixel. Note that the relationship between the pixel value indicating the luminance component of a pixel and the threshold is the same as the relationship plotted in FIG. 2.

Figure 15A:
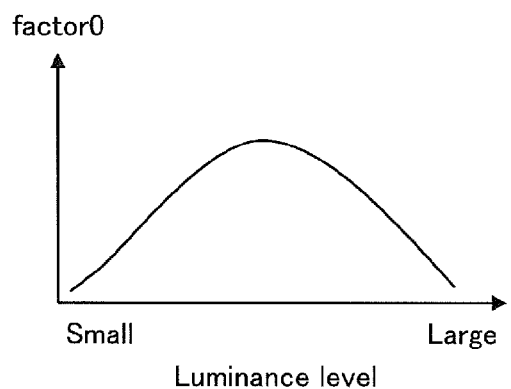
FIG. 15A is a plot showing the relationship between brightness level and factor 0.
Figure 15B:
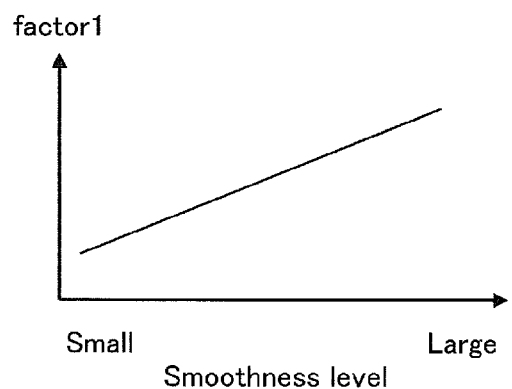
FIG. 15B is a plot showing the relationship between smoothness level and factor 1.

In addition, the threshold storage unit 2101 stores different correction coefficients (factor 0 and factor 1) for correcting the threshold. One of the correction coefficients (factor 0) varies according to the luminance level as shown in FIG. 15A, whereas the other correction coefficient (factor 1) varies according to the flatness level as shown in FIG. 15B.

Figure 15C:
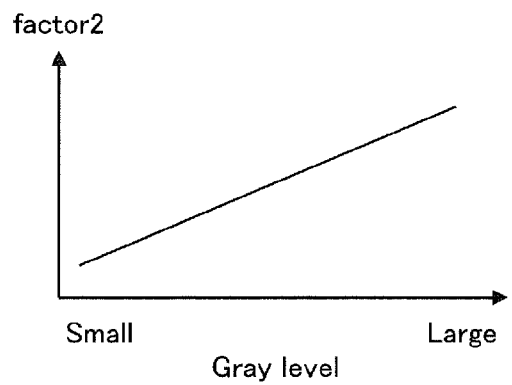
FIG. 15C is a plot showing the relationship between gray level and factor 2.

The threshold storage unit 2101 also stores a correction coefficient (factor 2) for correcting the threshold and the correction coefficient (factor 2) varies according to the gray level as shown in FIG. 15C.

(2) First Pixel Selecting Unit 2102

The first pixel selecting unit 2102 acquires, from the threshold storage unit 2101, the threshold Th corresponding to the pixel value indicating the luminance component of the target pixel in an input image signal.

In addition, the first pixel selecting unit 2102 acquires the flatness level with reference to the pixel values indicating the luminance components of the pixels contained in the pixel region surrounding the target pixel (the local region 300 shown in FIG. 3, for example).

The first pixel selecting unit 2102 acquires, from the threshold storage unit 2101, the coefficient factor 0 corresponding to the luminance level of the input image signal and the coefficient factor 1 corresponding to the thus acquired flatness level.

The first pixel selecting unit 2102 multiples the threshold Th by the predetermined gain g and the thus acquired factor 0 and factor 1 and calibrates the product of multiplication to determine the threshold Th1L and Th1U. Then, if the pixel value indicating the color difference component of each pixel contained in the 5×5 pixel region 400 surrounding the target pixel D shown in FIG. 4 falls within the range from (x−Th1L) to (x+Th1U), the first pixel selecting unit 2102 outputs a selection signal indicating that the corresponding image signal input to the first noise reduction unit 2103 is valid. Note that the value x is the pixel value of the target pixel D. Note that the thresholds Th1L and Th1U are determined in the same manner as that used in the first embodiment except for the initial values of thresholds Th1L and Th1U. Therefore, no description is given here.

(3) First Noise Reduction Unit 2103

According to the selection signals output by the first pixel selecting unit 2102, the first noise reduction unit 2103 acquires pixel values falling within the range from (x−Th1L) to (x+Th1U) from among the pixel values indicating the color difference components of the respective pixels contained in the local region 400. Then, the first noise reduction unit 2103 applies filtering to the thus acquired pixel values to output the results to the second pixel selecting unit 2104.

In addition, the first noise reduction unit 2103 outputs a signal indicating the gray level of the local region 400 to the second pixel selecting unit 2104. Note that the signal indicating the gray level may be generated by any other unit capable of making reference to pixels surrounding the target pixel, so that the first pixel selecting unit 2102 may handle the signal generation.

(4) Second Pixel Selecting Unit 2104

The second pixel selecting unit 2104 acquires, from the threshold storage unit 2101, the threshold Th corresponding to the pixel value indicating the luminance component of the target pixel in an input image signal.

In addition, the second pixel selecting unit 2104 acquires, from the threshold storage unit 2101, the coefficient factor 2 corresponding to the gray level output from the first noise reduction unit 2103.

The second pixel selecting unit 2104 acquires, from the threshold storage unit 2101, the coefficient factor 0 corresponding to the luminance level of the input image signal.

The second pixel selecting unit 2104 multiples the acquired threshold Th by the predetermined gain g and the thus acquired factor 0 and factor 2 and calibrates the product of multiplication to determine the threshold Th2L and Th2U.

Then, if the pixel value indicating the color difference component of each pixel contained in the pixel region 600 defined relatively to the 9×9 pixel region surrounding the target pixel D shown in FIG. 6 falls within the range from (x−Th1L) to (x+Th1U), the second pixel selecting unit 2104 outputs a selection signal indicating that the corresponding image signal input to the second noise reduction unit 2105 is valid. Note that the value x' is the modified pixel value of the target pixel D through the processing by the first noise reduction unit 2103. Note that the thresholds Th2L and Th2U are determined in the same manner as that used in the first embodiment, except for the initial values of thresholds Th2L and Th2U.

Therefore, no description is given here.

(5) Second Noise Reduction Unit 2105

On receiving input image signal indicating the color difference component, the second noise reduction unit 2105 acquires pixel values falling within the range from (x'−Th2L) to (x'+Th2U) from among the pixel values of the pixels in the pixel region 600 containing the target pixel D according to the selection signals output by the second pixel selecting unit 2104, applies filtering to the thus obtained pixel values, and produces an output image signal.

3.2 Operations (1) Overview

First, the overview of the processing by the image processing device 2000 is described with reference to the flowchart shown in FIG. 16.

The first pixel selecting unit 2102 performs processing for determining the thresholds Th1L and Th1U based on the pixel value x indicating the luminance component of the input pixel D (target pixel D shown in FIG. 3) to acquire the thresholds Th1L and Th1U (Step S400).

With respect to the pixel values indicating the color difference components of the respective pixels within the pixel region 400 surrounding the pixel D, the first noise reduction unit 2103 applies noise reduction processing to each pixel having a pixel value falling within the range of (x−Th1L) to (x+Th1U) to obtain the pixel value x' indicating the color difference component of the pixel D calibrated to reduce noise (Step S405).

The second pixel selecting unit 2104 performs processing for determining thresholds Th2L and Th2U based on the noise reduced pixel value x' of the input pixel D to acquire the thresholds Th2L and Th2U (Step S410).

With respect to the pixels within the pixel region 600 surrounding the pixel D, the second noise reduction unit 2103 applies noise reduction processing to each pixel having a pixel value falling within the range of (x'−Th2L) to (x'+Th2U) to acquire the output pixel value indicating the color difference component of the pixel D (Step S415).

(2) Processing for Determining Th1L and Th1U

Figure 16:
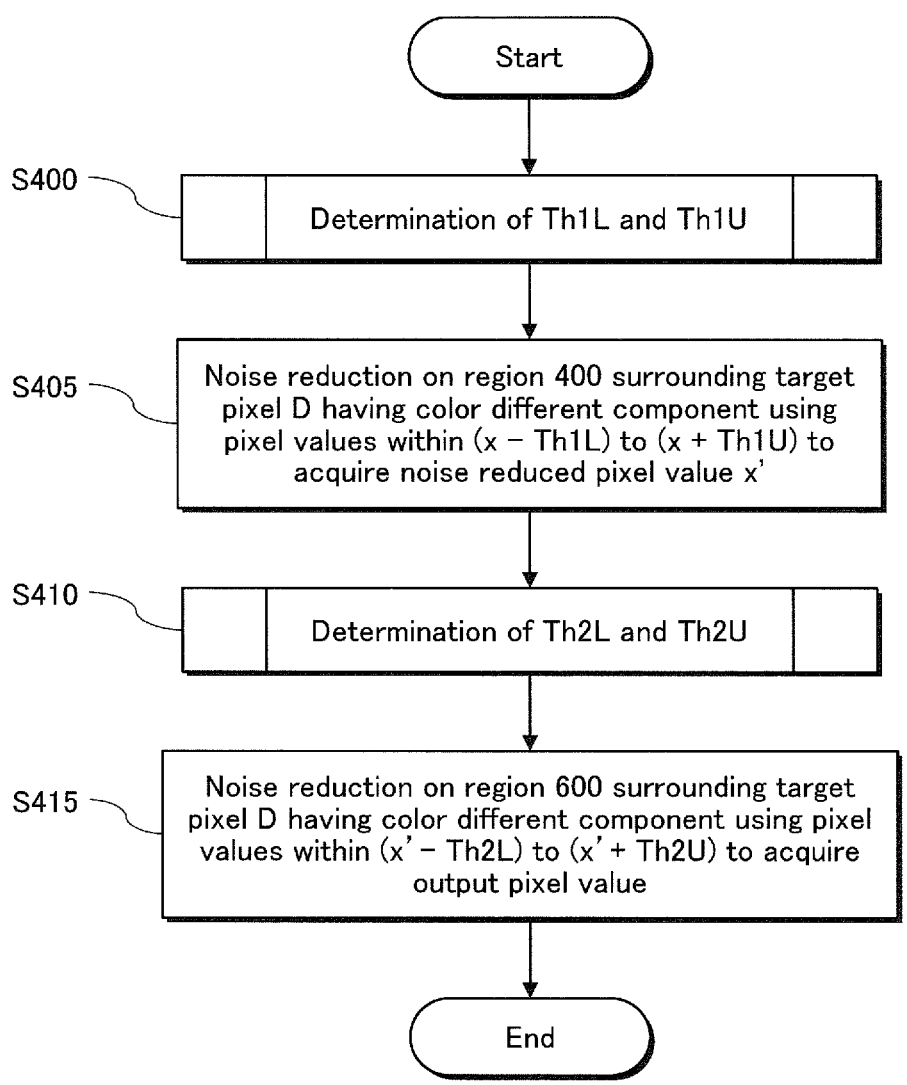
FIG. 16 is a flowchart showing operations of image processing performed by the image processing device 2000.

In the following description, the determination processing performed in Step S400 shown in FIG. 16 is described, focusing on difference with the determination processing shown in FIGS. 8 and 9 with respect to the first embodiment.

In the determination processing according to the present embodiment, Step S105 shown in FIG. 8 is altered to cause the first pixel selecting unit 2102 to acquire from the threshold storage unit 2101 the threshold Th corresponding to the pixel value indicating the luminance component of the target pixel in the input image signal, the coefficient factor 0 corresponding to the luminance level of the input image signal, and the coefficient factor 1 corresponding to the flatness level of the input image signal In addition, Step S110 shown in FIG. 8 is altered to compute "Th1L=Th1U=Th*g*factor 0\*factor 1".

Figure 9:
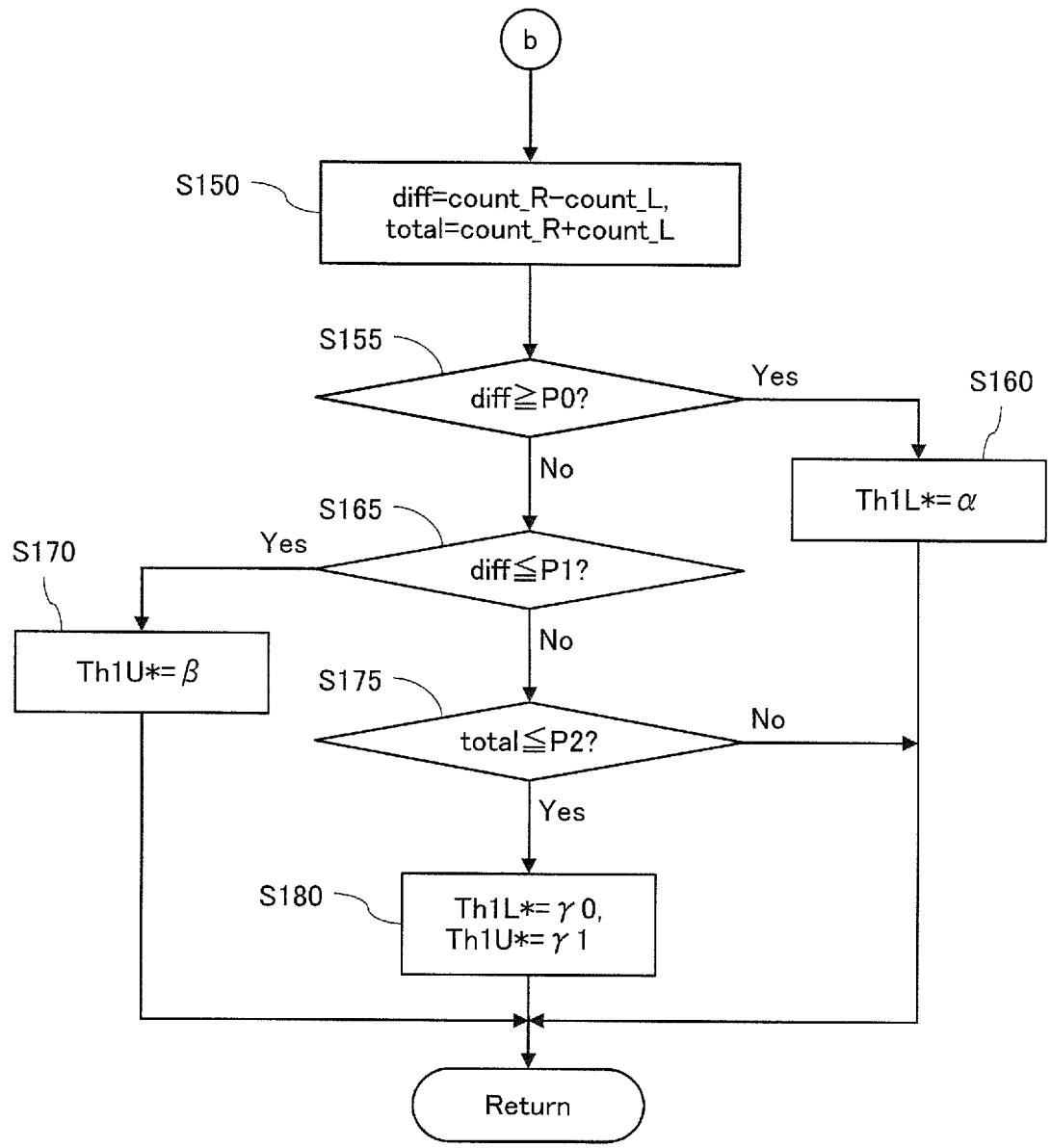
FIG. 9 is a flowchart showing operations of the processing for determining Th1L and Th1U (continued from FIG. 8).

As for Step S115 and the following steps shown in FIGS. 8 and 9, no substantial change is made in the processing flow, except that at least the values of P0, P1, P2, α, β, γ0, and γ1 are changed.

(3) Processing for Determining Th2L and Th2U

The following describes processing for determining Th2L and Th2U, focusing on difference with the processing for determining Th1L and Th1U described above in the first embodiment.

In the determination processing according to the present embodiment, Step S105 shown in FIG. 8 is altered to cause the second pixel selecting unit 2104 to acquire from the threshold storage unit 2101 the threshold Th corresponding to the pixel value indicating the luminance component of the target pixel in the input image signal, the coefficient factor 0 corresponding to the luminance level of the input image signal, and the coefficient factor 1 corresponding to the gray level of the input image signal.

In addition, Step S110 shown in FIG. 8 is altered to compute "Th2L=Th2U=Th*g*factor 0\*factor 2".

As for Step S115 and the following steps shown in FIGS. 8 and 9, no substantial change is made in the processing flow, except that at least the values of P0, P1, P2, α, β, γ0, and γ1 are changed.

3.3 Modification

The present invention is not limited to the specific embodiment described above. Various embodiments including the following may be made.

(1) In the above embodiment, the luminance level, the smoothness level, and the gray level shown in FIGS. 14A, 14B, and 14C may be found by linear interpolation from a lookup table listing possible thresholds indexed by flatness levels or from a line graph associating the respective values with possible thresholds.

3.4 Recapitulation

As has been described above, when a noise model is represented by a normal distribution and the pixel value indicating the color difference component of a target pixel D appears at the end of the distribution curve, the image processing device of the present embodiment adjusts one of the threshold ranges +Th1 and −Th1 that are determined with respect to the position at which the pixel value of the target pixel D appears, so that one of the threshold ranges +Th1 and −Th1 is made narrower than the other. Note that the threshold range adjusted to be narrower is the one located closer toward the end of the distribution curve from the position at which the value of the target pixel appears. As a result of this adjustment, excessive noise reduction or equivalently excessive smoothing at details and edges of an image is avoided, which enables the image processing device to carry out noise reduction without causing blurring of edges and details.

Furthermore, the input image signal indicating the luminance component mentioned in the present embodiment may be the signal resulting from the image processing described in the first embodiment. In this way, the result of the processing according to the present embodiment is further improved.

4. Fourth Embodiment

The following describes operations of an image processing device 3000 according to a fourth embodiment.

4.1 Structure

Figure 17:
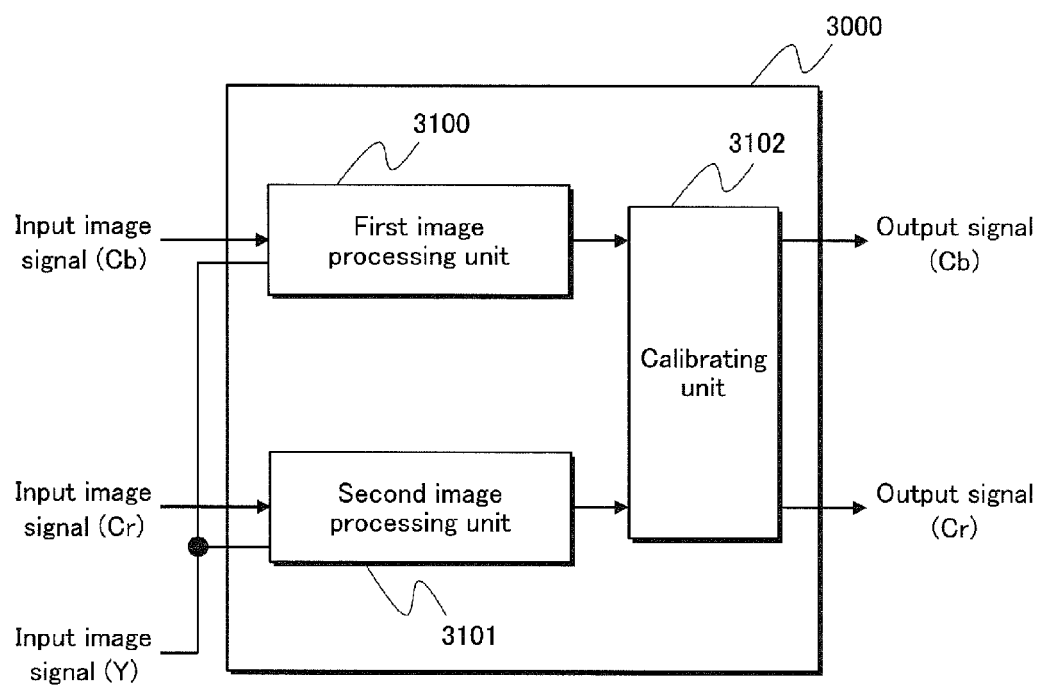
FIG. 17 is a block diagram showing the structure of an image processing device 3000.

As shown in FIG. 17, the image processing device 3000 includes a first image processing unit 3100, a second image processing unit 3101, and a calibrating unit 3102.

(1) First Image Processing Unit 3100

The first image processing unit 3100 performs noise reduction processing on an input image signal (Cb) indicating the blue color difference component based on the input image signal (Y) indicating the luminance component, and outputs a noise reduced signal resulting from the noise reduction processing of color difference Cb (hereinafter, first output image signal).

Figure 18:
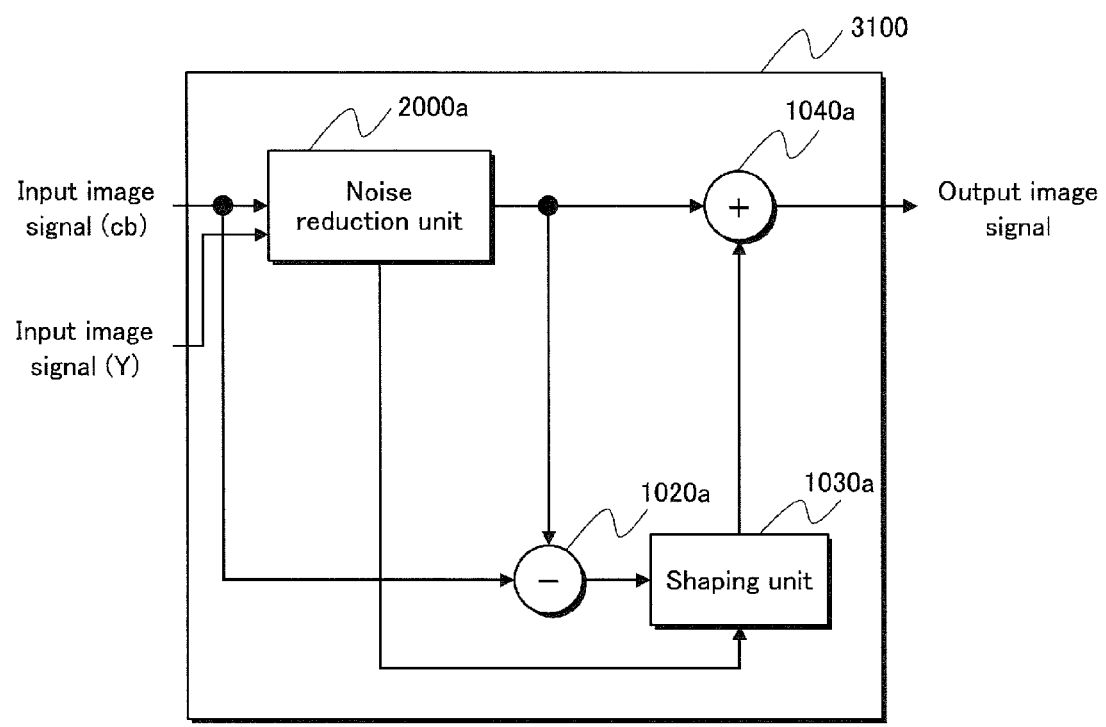
FIG. 18 is a block diagram showing the structure of a first image processing unit 3100.

As shown in FIG. 18, the first image processing unit 3100 includes a noise reduction unit 2000a, a subtracter 1020a, a shaping unit 1030a, and an adder 1040a.

The noise reduction unit 2000a has the same processing function as that of the image processing device 2000 described in the third embodiment. Therefore, no description is given here.

In addition, the subtracter 1020a, the shaping unit 1030a, and the adder 1040a are the same as the subtracter 1020, the shaping unit 1030, and the adder 1040, respectively. Therefore, the description of those component units is omitted as well.

(2) Second Image Processing Unit 3101

The second image processing unit 3101 performs noise reduction processing on an input image signal (Cr) indicating the red color difference component based on the input image signal (Y) indicating the luminance component, and outputs a noise reduced signal resulting from the noise reduction processing of color difference Cr (hereinafter, second output image signal).

The component units of the second image processing unit 3101 are the same as those of the first image processing unit 3100, except for that the input image signal (Cr) processed indicates a red color difference component rather than a blue color difference component. Therefore, no description is given here.

(3) Calibrating Unit 3102

The calibrating unit 3102 takes as input the first output image signal and the second output image signal, and calibrates the respective image signals to output an output image signal (Cb) indicating the blue color difference component and an output image signal (Cr) indicating the red color difference component.

Figure 19A:
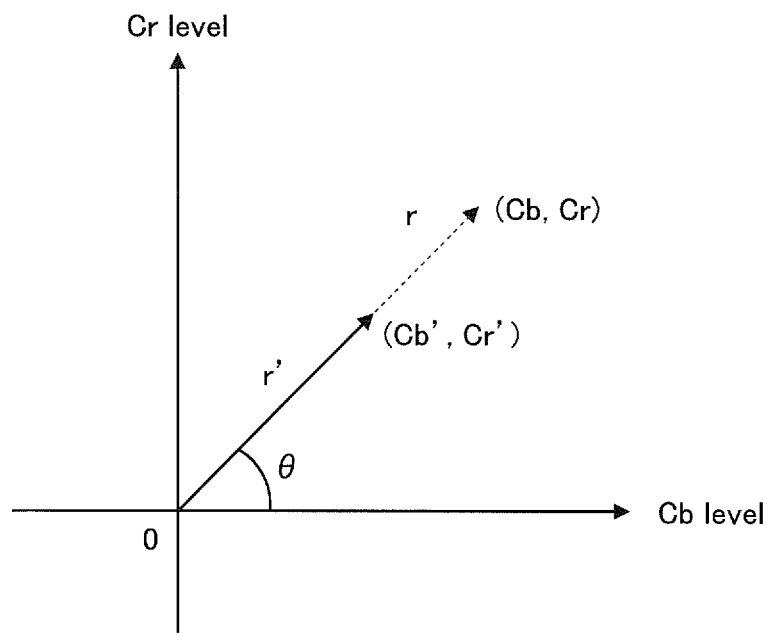

More specifically, as shown in FIG. 19A, the norm r for the vector (Cb, Cr)=(Level of the first output image signal, the level of the second output image signal is defined as |Cb|+ |Cr|). For the calibrated Cb' and Cr, the norm r' for the vector (Cb', Cr') is defined as |Cb'|+|Cr'| in a similar manner.

Figure 19B:
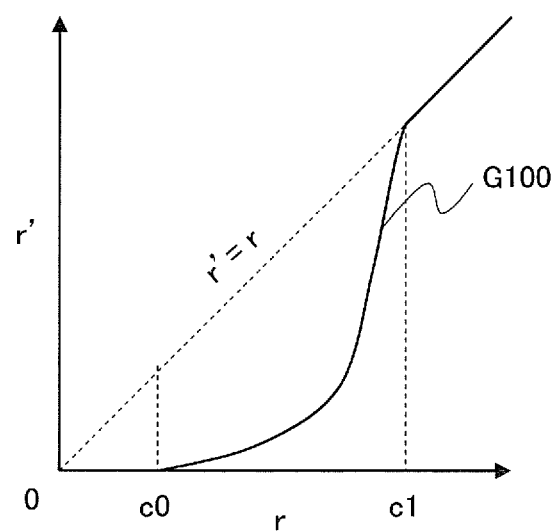
FIG. 19B is a plot showing the relationship between norm r and norm r'.

Note that the relationship between r and r' is represented by a graph G100 shown in FIG. 19B. More specifically, when r takes a value inside the interval [0, c0], r' takes a specific value (at "0" in this example). On the other hand, when r takes a value inside the interval [c0, c1], r' takes a value found on a monotonically increasing curve. When r takes a value inside the interval [c1, ∞], then r' takes a value that is found on a straight line representing r'=r. That is, by the value of r' that is uniquely assigned by the norm r, the values of Cb and Cr are given by r'cos θ and r'sin θ, respectively. Note that θ denotes the angle given by the vector (Cb, Cr).

The calibrating unit 3102 outputs an output image signal (Cb) indicating the blue color difference component and an output image signal (Cr) indicating the red color difference. Here, the signal level of the output image signal (Cb) signal level Cb is set equal to the value given by r'cos θ, and the signal level of the output image signal (Cr) is set equal to the value given by r'sin θ.

4.2 Operations

The following describes operations of the image processing device 3000.

Figure 20:
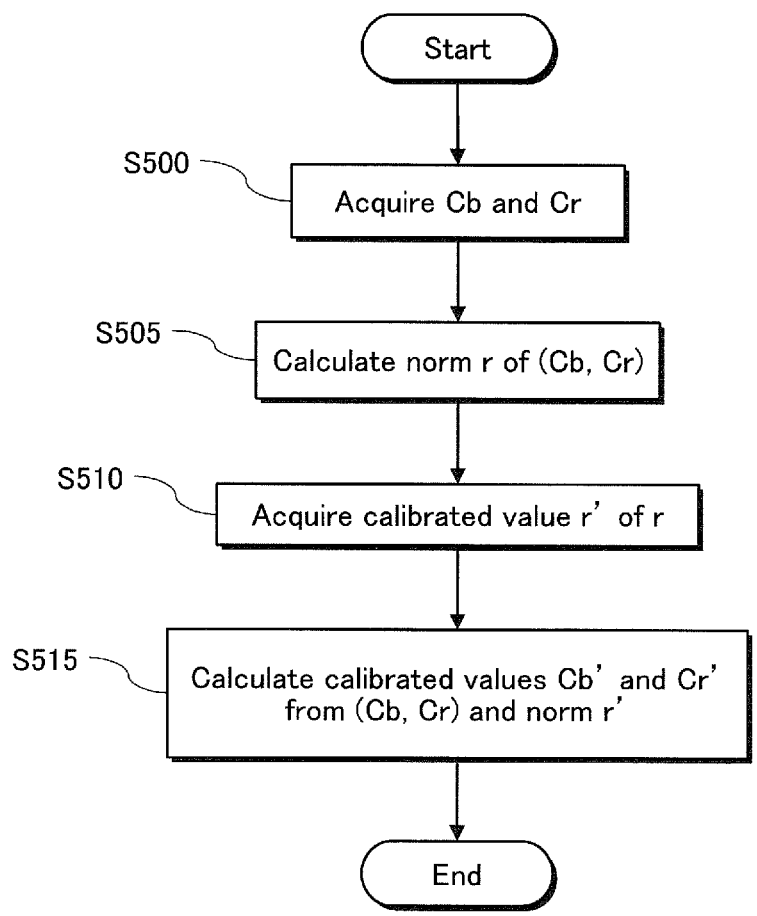
FIG. 20 is a flowchart of operations of a calibrating unit 3102.

Note that the operations relating noise reduction, i.e., the operations of the noise reduction unit 2000a, are already described in the third embodiment, and the operations of the shaping unit 1030a are already described in the second embodiment. Therefore, the following describes operations of the calibrating unit 3102, with reference to the flowchart in FIG. 20.

The calibrating unit 3102 receives the first output image signal (Cb) from the first image processing unit 3100 and the second output image signal (Cr) from the second image processing unit 3101 (Step S500).

The calibrating unit 3102 calculates the norm r based on the received Cb and Cr (Step S505).

The calibrating unit 3102 finds the corrected value r' of the norm from the thus calculated norm r and the graph G100 shown in FIG. 19B (Step S510).

The calibrating unit 3102 then calculates the corrected value Cb' for the first output image signal (Cb) and the corrected value Cr' for the second output image signal (Cr) from the angle θ and the corrected value r' (Step S515). The angle θ is determined by the vector (Cb, Cr) of the first output image signal (Cb) and the second output image signal (Cr).

4.3 Modification

The present invention is not limited to the specific embodiment described above. Various embodiments including the following may be made.

(1) In the present embodiment, the description is given with respect to 1-norm, which is merely an example. Alternatively, 2-norm may be used.

In such a modification, the norm r is defined as "$(Cb^2+Cr^2)^{1/2}$", which is the square root of a sum of the square of Cb and the square of Cr.

(2) Alternatively to the plot shown in FIG. 19B, linear interpolation from a lookup table indexed by norm r or from a line graph plotted along a norm r may be used.

(3) In this embodiment, an image signal Cb indicating blue color difference component and an image signal Cr indicating red color difference component are used in processing. However, these signals are mentioned merely by way of example and without limitation.

Alternatively, an image signal Pb indicating blue color difference component and an image signal Pr indicating red color component may be used. In such a modification, an input image signal (Y) indicating luminance component is determined by Pb and Pr.

(4) Any combination of the embodiment and mortifications still fall within the scope of the present invention.

4.4 Recapitulation

As has been described above, the image processing device of the present embodiment realizes noise reduction on the color components of pixels so that edges and details of an image are restored although the edges and details are the same level as the noise components. This makes it possible to obtain more suitable images by, for example, calibrating Cb and Cr in relation to each other to prevent color shift.

5. Modification

Up to this point, the present invention has been described by way of the embodiments. However, the present invention is not limited to the specific embodiments described above. Various embodiments including the following may be made.

(1) In each of the above embodiments, the noise reduction performed is composed of two phases. However, this is described merely by way of example and without limitation. The image processing device may perform the noise reduction processing composed of more than two phases.

Figure 21A:
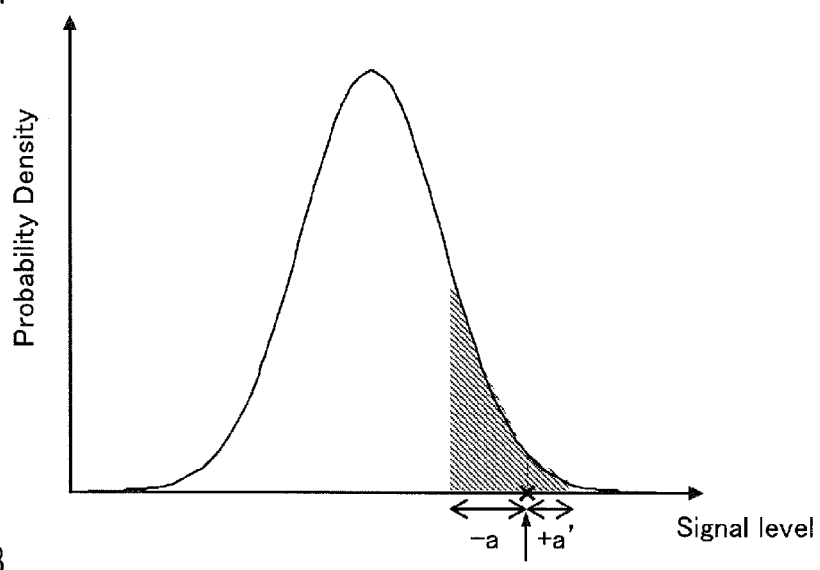
FIGS. 21A, 21B, and 21C are plots showing changes in the pixel value before and after noise reduction.

For example, as shown in FIG. 21A, on the normal distribution curve representing a noise model, the he pixel value x of the target pixel appears at a position near the right end of the curve with respect to the center of the curve.

Figure 21B:
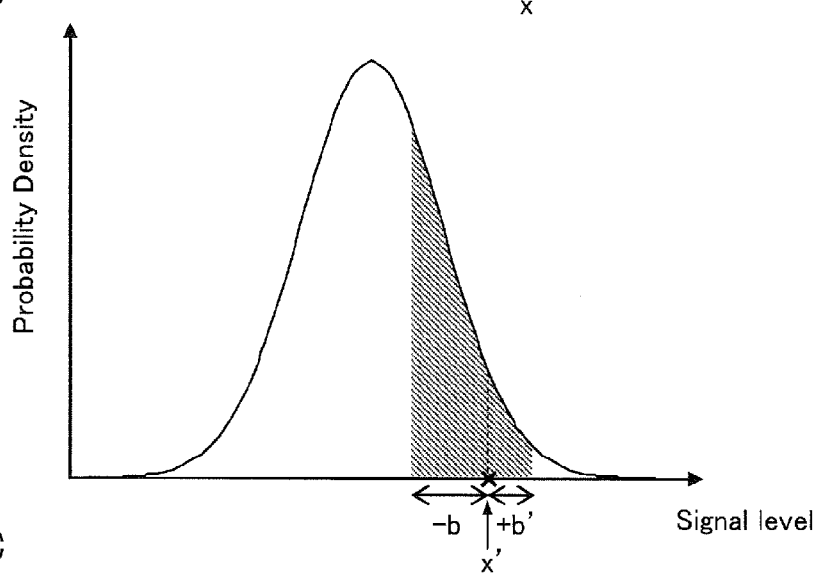

In this case, the first pixel selecting unit adjusts the range (+a', in this example) corresponding to values larger than the pixel value x to be narrower than the range (−a, in this case) corresponding to values smaller than the pixel value. When the noise reduction is carried out by the first noise reduction unit with the ranges adjusted in the above manner, the pixel value x' resulting from the noise reduction is smaller than the pixel value x, i.e., closer to the median (true value) appearing at the top of the normal distribution curve (see FIG. 21B).

Figure 21C:
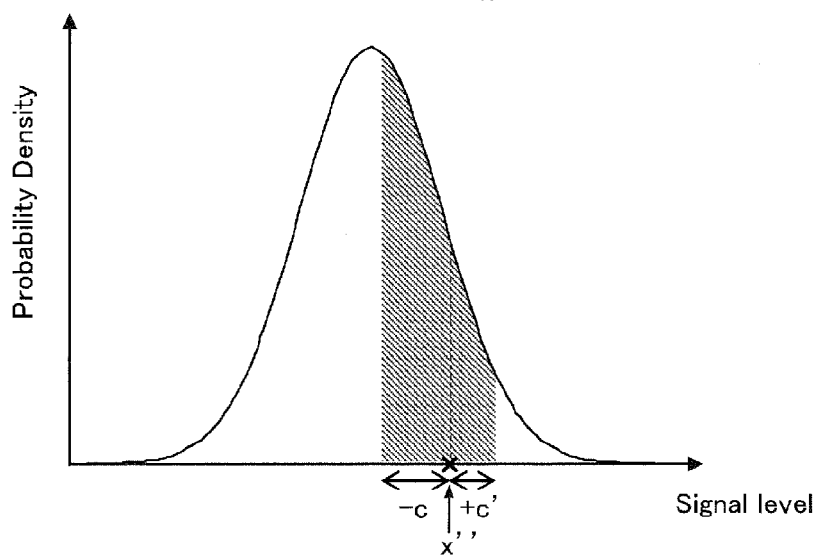
Figure 22A:
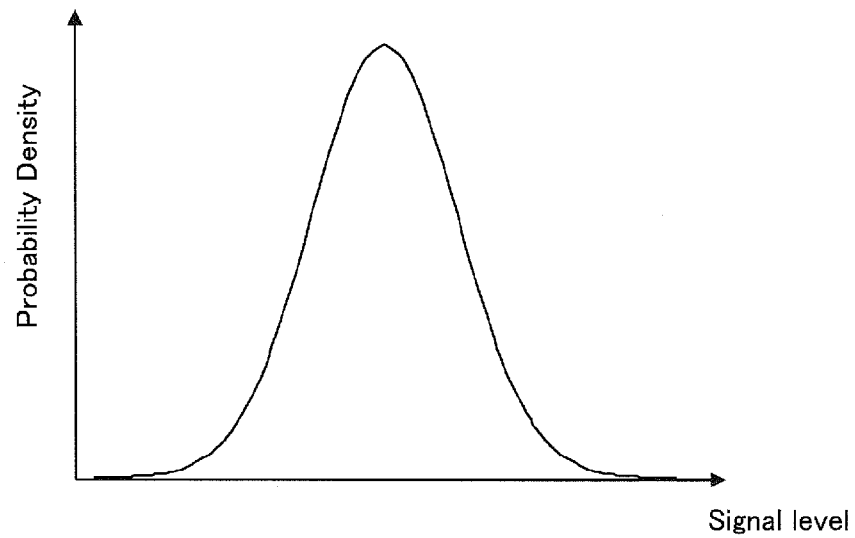
FIGS. 22A, 22B, and 22C are plots for illustrating the range of a threshold c of an ε filter.
Figure 22B:
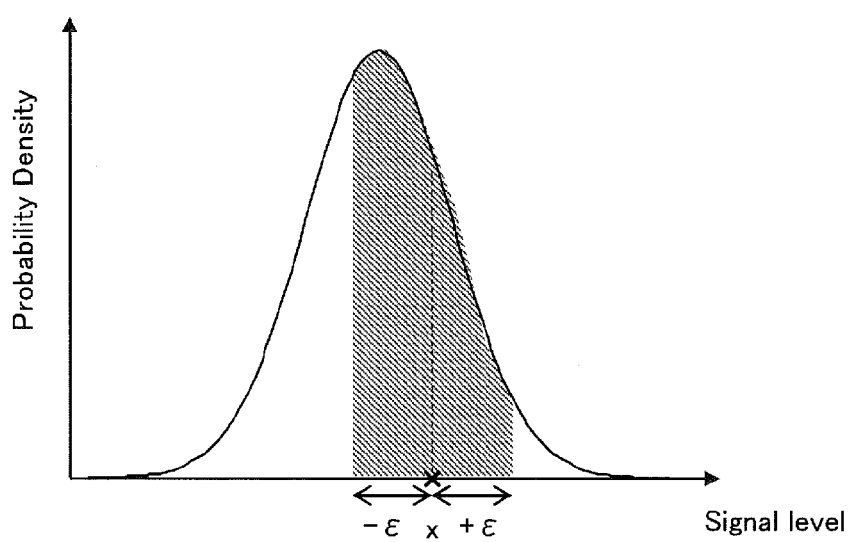
Figure 22C:
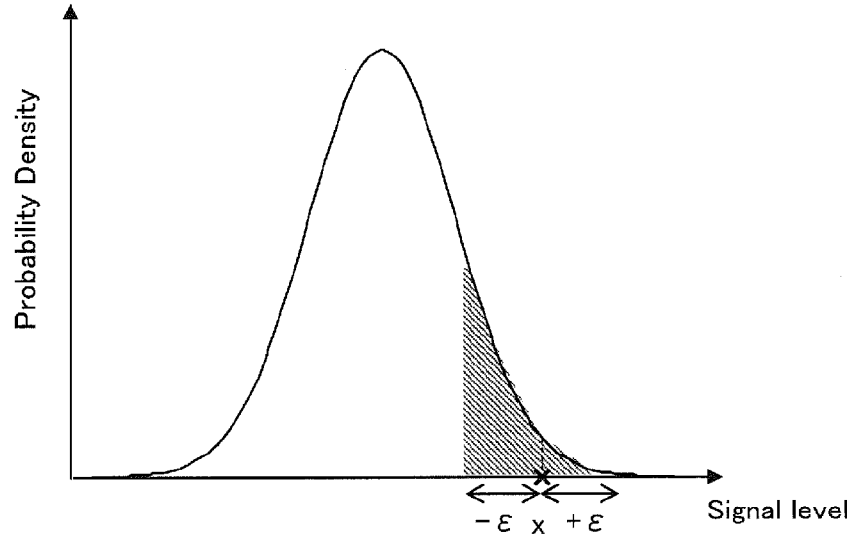

With respect to the pixel value x', the second pixel selecting unit adjusts the range (+b', in this example) corresponding to values larger than the pixel value x' to be narrower than the range (−b, in this case) corresponding to values smaller than the pixel value x'. When the noise reduction is carried out by the second noise reduction unit with the ranges adjusted in the above manner, the pixel value x" resulting from the noise reduction by the second noise reduction unit is smaller than the pixel value x', i.e., even closer to the median (true value) appearing at the top of the normal distribution curve (see FIG. 21C).

When the noise reduction is performed for the third time, the third image selecting unit adjusts the range (+c', in this example) corresponding to values larger than the pixel value x" to be narrower than the range (−c, in this case) corresponding to values smaller than the pixel value x". When the noise reduction is carried out by the third noise reduction unit with the ranges adjusted in the above manner, the pixel value x" resulting from the noise reduction by the third noise reduction unit is smaller than the pixel value x", i.e., even closer to the median (true value) appearing at the top of the normal distribution curve.

As described above, for each phase of the noise reduction processing, the resulting value converges to a value with higher probability density, or equivalently to a value expected to be a true value.

In the noise reduction processing composed of two phases, the gain value used in the second phase (2.5, for example) is smaller than the gain value used in the first phase (3, for example). In addition, the image region subjected to noise reduction in the second phase (5×5 pixel region) is larger than that in the first phase (3×3 pixel region). The same holds in the noise reduction processing composed of more phases. That is, the gain value used in the (n+1)th phase of the noise reduction processing is smaller than the gain value used in the n-th phase (where n is an integer equal to 1 or greater). In addition, the image region subjected to the (n+1)th phase of the noise reduction processing is larger than that subjected to the n-th phase noise reduction. For each phase of the noise reduction processing, the gain value is set smaller than that used in the previous phase, so that the range of pixel values used in the noise reduction becomes narrower. Whereas the range of pixel values is made narrower for each phase of the noise reduction processing, the image region subjected to noise reduction is made larger than that in the previous phase. Consequently, in the (n+1)th phase of the noise reduction processing, although the image region processed is larger than that processed in the n-th phase, blurring of edges and details of the image is avoided because the range of pixel values used is narrower than that used in the n-th phase.

(2) In the determination of Th1L and Th1U according to the above embodiments, when the pixel value of the target pixel D appears near one of the ends of the normal distribution curve, one of the range up to the threshold "+Th1" and the range up to the threshold "−Th1" that is located closer to the end of the distribution curve is adjusted to be narrower than the other. However, this is described merely by way of example and without limitation.

Alternatively, one of the range up to the threshold "+Th1" and the range up to the threshold "−Th1" that is closer to the median from the pixel value may be made narrower than the other.

With the above adjustment of the range up to the threshold "+Th1" and the range up to the threshold "−Th1" both determined with respect to the pixel value of the target pixel D, it is still true that one of the range located closer to the end of the distribution curve is made smaller than the other range. Therefore, the same effect as that produced by the above embodiments is obtained.

(3) In the determination of Th1L and Th1U according to the above embodiments, when the pixel value of the target pixel appears near one of the ends of the normal distribution curve, one of the range up to the threshold "+Th1" and the range up to the threshold "−Th1" that is located closer to the end of the distribution curve is adjusted to be narrower than the other. However, this is described merely by way of example and without limitation.

Even in the case where the pixel value of the target pixel D appears at a location near an end of the distribution curve, the noise reduction processing may be carried out without any adjustment to the range up to the threshold "+Th1" and the threshold "−Th1" both determined with reference to the pixel value of the target pixel D.

In this case, the image processing device uses a smaller gain value in the (n+1)th phase of the noise reduction processing than the gain value used in the n-th phase (where n is an integer equal to 1 or greater). In addition, the image region subjected to the (n+1)th phase of the noise reduction processing is larger than the pixel region subjected to the n-th phase noise reduction. Consequently, in the (n+1)th phase of the noise reduction processing, although the image region processed is larger than that processed in the n-th phase, blurring of edges and details of the image is avoided because the range of pixel values used is narrower than that used in the n-th phase.

(4) The structures according to the embodiments described above may be realized by an LSI (Large Scale Integration) which is an integrated circuit. Each component unit of these structures may be implemented on a single chip or some or all of components may be implemented on a single chip. In addition, although an LSI is specifically mentioned, it may be referred to as IC (Integrated Circuit), system LSI, super LSI, or ultra LSI, depending on the degree of integration of the circuit. In addition, the scheme employed to realize an integrated circuit is not limited to LSI and such an integrated circuit may be realized by a dedicated circuit or by a general-purpose processor. For example, it is applicable to use an FPGA (Field Programmable Gate Array) that enables post-manufacturing programming of an LSI circuit or a reconfigurable processor that allows reconfiguration of connection between circuit cells within an LSI circuit and their settings. Alternatively, the computation by these functional blocks may be done with the use of DSP (Digital Signal Processor) or CPU (Central Processing Unit), for example. In addition, these processing steps may be realized through execution of an appropriate program recorded on a recording medium.

When any new circuit integration technology becomes available or derived as the semiconductor technology advances, such new technology may be employed to integrate the functional blocks. One possible candidate of such new technology may be achieved by adapting biotechnology.

(5) Any of the procedures described in the above embodiments may be described as a program stored on memory, so that the procedure is realized by reading the program from the memory and executing the read program.

In addition, such a program describing the procedure may be recorded on recording mediums for distribution.

(6) Any combination of the embodiments and mortifications described above still fall within the scope of the present invention.

6. Supplemental (1) In one aspect of the present invention, an image processing device for correcting pixel values of an image to reduce noise in the image includes: a determination unit and a generating unit. The determination unit is configured to: specify, on a normal distribution representing a noise model of the image, a reference range having a value of a target pixel as a median; compute, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median; correct one of the first sub-range and the second sub-range so that one of the sub-ranges in which a fewer number of pixels are distributed than in the other sub-range is narrower relative to the other sub-range; and determine a selection range that is composed of the one of the first sub-range and the second sub-range as corrected and the other one of the first sub-range and the second sub-range as is. The generating unit is configured to generate a corrected value for the target pixel by correcting values of pixels contained in a target region to reduce noise, the target region being an image region subjected to noise reduction and at least containing the local region, and the value correction involving use of values falling within the selection range from among the values of the respective pixels contained in the target region.

With the structure described above, the image processing device corrects a reference range having the pixel value of the target pixel as the median, so that one of a first sub-range and a second sub-range of the reference range is made narrower than the other sub-interval, depending on the number of pixel values falling within the respective ranges. This range correction reduces the possibilities of selecting pixels affected by pixels of another object, i.e., pixels corresponding to edges or details, for noise reduction processing. Consequently, noise is removed or reduced without causing blurring of edges and details of the image.

(2) Here, the target region is designated as an initial target region. The image processing device may further includes: an output unit configured to perform noise reduction on an enlarged target region based on the corrected target pixel value and output an image represented by pixel values resulting from the noise reduction, the enlarged target region being an image region subjected to noise reduction by the output unit and at least containing the initial target region.

With the structure described above, the image processing device first performs noise reduction by the generating unit on an image region (initial target region) and then performs further noise reduction on an image region (enlarged target region) that is larger than the initial target region. Consequently, noise is reduced even further. In addition, the noise reduction has been performed by the generating unit before the further noise reduction. Therefore, the pixel value for the target pixel has been corrected to be closer to the true value of the normal distribution than the initial pixel value, so that possibilities of selecting pixels having pixel values appearing at the end of the normal distribution curve are reduced. By virtue of the above, the image processing device is enabled to perform further noise reduction by the output unit without causing blurring of edges and details of the image.

(3) Here, the output unit may be configured to further acquire a smoothness level of the enlarged target region based on a value of each pixel contained in the enlarged target region. The image processing device may further include: an acquiring unit configured to acquire, by using the smoothness level, part of removed components, the removed components determined based on the image input from an external source to the image processing device and the image to be output by the output unit; and an adding unit configured to add the acquired part of the removed components to the image to be output by the output unit.

With the above structure, the image processing device acquires add-on components based on the smoothness level, from the difference between th input image and the noise reduced image. Consequently, the image processing device is enabled to restore the loss of image corresponding to the noise level add-on components (edges and details, for example) once removed by the noise reduction.

(4) Here, each pixel of the image may have a color difference component and a luminance component. The noise model may be a representation of a pixel value associated with a standard deviation. The determination unit may be configured to: specify a standard deviation corresponding to the value of the target pixel from the noise model; and specify the reference range based on (i) the standard deviation, (ii) a first value determined according to a luminance level of the target pixel, and (iii) a second value determined according to the smoothness level of the initial target region. The generating unit may be configured to generate the corrected value for the target pixel, by correcting the color difference component values of pixels contained in the initial target region to reduce noise, and the value correction involving use of values falling within the selection range from among the color difference component values of the respective pixels contained in the initial target region.

With the above structure, the image processing device is enabled to reduce noise from the color components of the pixels without causing blurring of edges and details.

(5) Here, the output unit may be configured to: specify a standard deviation corresponding to the corrected target pixel value from the noise model; specify a corrected reference range having the corrected target pixel value as a median based on (i) the standard deviation corresponding to the corrected target pixel value, (ii) the first value, and (iii) a third value determined according to a gray level of a corrected target region that is an image region at least containing the initial target region; compute, with respect to the corrected target region, the number of pixels having a value falling within a third sub-range of the corrected reference range and the number of pixels having a value falling within a fourth sub-range of the corrected reference range, the third sub-range corresponding to larger values than the corrected target pixel value and the fourth sub-range corresponding to smaller values than the corrected target pixel value; correct one of the third sub-range and the fourth sub-range in which a fewer number of pixels are distributed than in the other sub-range to be narrower than the other sub-range; determine a corrected selection range that is composed of the one of the third sub-range and the fourth sub-range as corrected and the other one of the third sub-range and the fourth sub-range as is; and generate a pixel value for the target pixel of the image to be output, by reducing noise from the enlarged target region that is an image region at least containing the corrected target region, and the noise reduction of the new target region involving use of values falling within the corrected selection range from among the values of the respective pixels contained in the enlarged target region.

With the above structure, the image processing device is configured so that the output unit is enabled to perform further reduce noise from the color components of the pixels without causing blurring of edges and details.

(6) Here, the color difference component may have a first color difference component and a second color difference component. The determining unit may include a first determiner and a second determiner. The first determiner is configured to determine a first selection range based on a first color difference component value of a pixel of the image. The second determiner is configured to determine a second selection range based on a second color difference component value of a pixel of the image. The generating unit may include a first generator and a second generator. The first generator is configured to generate a first corrected value for the first color difference component value of the target pixel by correcting the first color difference component values of pixels contained in the initial target region to reduce noise, the correction of the first color difference component values involving use of values falling within the first selection range from among the first color difference component values of the respective pixels contained in the initial target region. The second generator is configured to generate a second corrected value for the second color difference component value of the target pixel by correcting the second color difference component values of pixels contained in the initial target region to reduce noise, the correction of the second color difference component values involving use of values falling within the second selection range from among the second color difference component values of the respective pixels contained in the initial target region. The output unit may include a first output sub-unit and a second output sub-unit. The first output sub-unit is configured to reduce noise from the enlarged target region based on the first corrected value of the target pixel and output an image represented by pixel values resulting from the noise reduction in terms of the first color difference components. The second output sub-unit is configured to reduce noise from the enlarged target region based on the second corrected value of the target pixel and output an image represented pixel values resulting from the noise reduction in terms of the second color difference component. The image processing device may further include: a calibrating unit configured to calibrate the first color difference component value of each pixel in the image to be output by the first output sub-unit and the second color difference component value of each pixel in the image to be output by the second output sub-unit, the calibration being made by applying norm processing to the first and second color difference component values.

With the above structure, the image processing device applies the norm processing to pixel values representing the first color difference components and pixel values representing the second color difference components after the noise reduction. The thus calibrated pixel values represent a more enhanced image without color shift.

(7) Here, the output unit may be configured to: specify, on the normal distribution representing the noise model of the image, a new reference range that is narrower than the reference range and having the corrected target pixel value as a new median; determine, for each pixel contained in the enlarged target region, a new selection range based on the new median and the new reference range and in cooperation with the determination unit; and perform noise reduction using values falling within the new selection range from among the values of the respective pixels contained in the enlarged target region.

With this structure, the image processing device is enabled to reduce the possibilities of selecting pixels affected by pixels of another object, i.e., pixels corresponding to edges or details, for noise reduction processing by the output unit. Consequently, noise is reduced without causing blurring of edges and details of the image.

(8) In another aspect of the present invention, an image processing device for correcting pixel values of an image to reduce noise includes a first noise reduction unit and a second noise reduction unit. The first noise reduction unit is configured to: specify, on a normal distribution representing a noise model of the image, a first reference range having a value of a target pixel as a median; and generate noise reduced pixel values by performing noise reduction processing on an initial target region that is an image region subjected to noise reduction and containing the target pixel, the noise reduction of the initial target region involving use of values falling within the first reference range from among values of respective pixels contained in the target region. The second noise reduction unit is configured to: specify, on the normal distribution representing the noise model of the image, a second reference range narrower than the first reference range and having, as a median, the noise reduced pixel value generated for the target pixel; and generate noise reduced pixel values by performing noise reduction processing on an enlarged target region that is an image region subjected to noise reduction and at least containing the initial target region, the noise reduction of the enlarged target region involving use of values falling within the second reference range from among values of respective pixels contained in the target region.

With this structure, the image processing device is configured so that the first range used by the first noise reduction unit is narrower than the second range used by the second noise reduction unit, while the image region subjected to noise reduction by the first noise reduction unit is larger than the image region subjected to noise reduction by the second noise reduction unit. As a consequence, the noise reduction by the second noise reduction unit is performed without causing blurring of edges and details of the image.

INDUSTRIAL APPLICABILITY

The image processing device according to the present invention reduces noise without causing blurring edges and details of the image and therefore suitably applicable to image capturing systems such as a digital camera as well as to digital televisions and video systems.

REFERENCE SIGNS LIST

10 Image Processing Device
101 Threshold Storage Unit
102 Pixel Selecting Unit
103 Noise Reduction Unit
104 Pixel Selecting Unit
105 Noise Reduction Unit

The invention claimed is:

1. An image processing device for correcting pixel values of an image to reduce noise in the image, the image processing device comprising:
 a determination unit configured to:
  specify, on a normal distribution representing a noise model of the image, a reference range having a value of a target pixel as a median;
  compute, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median;

correct one of the first sub-range and the second sub-range so that one of the sub-ranges in which a fewer number of pixels are distributed than in the other sub-range is narrower relative to the other sub-range; and determine a selection range that is composed of the one of the first sub-range and the second sub-range as corrected and the other one of the first sub-range and the second sub-range as is; and a generating unit configured to generate a corrected value for the target pixel by correcting values of pixels contained in a target region to reduce noise, the target region being an image region subjected to noise reduction and at least containing the local region, and the value correction involving use of values falling within the selection range from among the values of the respective pixels contained in the target region.

2. The image processing device according to claim 1, wherein
the target region is designated as an initial target region, the image processing device further comprising:
an output unit configured to perform noise reduction on an enlarged target region based on the corrected target pixel value and output an image represented by pixel values resulting from the noise reduction, the enlarged target region being an image region subjected to noise reduction by the output unit and at least containing the initial target region.

3. The image processing device according to claim 2, wherein
the output unit is configured to further acquire a smoothness level of the enlarged target region based on a value of each pixel contained in the enlarged target region, the image processing device further comprising:
an acquiring unit configured to acquire, by using the smoothness level, part of removed components, the removed components determined based on the image input from an external source to the image processing device and the image to be output by the output unit; and
an adding unit configured to add the acquired part of the removed components to the image to be output by the output unit.

4. The image processing device according to claim 2, wherein
each pixel of the image has a color difference component and a luminance component,
the noise model is a representation of a pixel value associated with a standard deviation,
the determination unit is configured to:
specify a standard deviation corresponding to the value of the target pixel from the noise model; and
specify the reference range based on (i) the standard deviation, (ii) a first value determined according to a luminance level of the target pixel, and (iii) a second value determined according to the smoothness level of the initial target region, and
the generating unit is configured to generate the corrected value for the target pixel, by correcting the color difference component values of pixels contained in the initial target region to reduce noise, and the value correction involving use of values falling within the selection range from among the color difference component values of the respective pixels contained in the initial target region.

5. The image processing device according to claim 4, wherein
the output unit is configured to:
specify a standard deviation corresponding to the corrected target pixel value from the noise model;
specify a corrected reference range having the corrected target pixel value as a median based on (i) the standard deviation corresponding to the corrected target pixel value, (ii) the first value, and (iii) a third value determined according to a gray level of a corrected target region that is an image region at least containing the initial target region;
compute, with respect to the corrected target region, the number of pixels having a value falling within a third sub-range of the corrected reference range and the number of pixels having a value falling within a fourth sub-range of the corrected reference range, the third sub-range corresponding to larger values than the corrected target pixel value and the fourth sub-range corresponding to smaller values than the corrected target pixel value;
correct one of the third sub-range and the fourth sub-range in which a fewer number of pixels are distributed than in the other sub-range to be narrower than the other sub-range;
determine a corrected selection range that is composed of the one of the third sub-range and the fourth sub-range as corrected and the other one of the third sub-range and the fourth sub-range as is; and
generate a pixel value for the target pixel of the image to be output, by reducing noise from the enlarged target region that is an image region at least containing the corrected target region, and the noise reduction of the new target region involving use of values falling within the corrected selection range from among the values of the respective pixels contained in the enlarged target region.

6. The image processing device according to claim 5, wherein
the color difference component has a first color difference component and a second color difference component,
the determining unit includes:
a first determiner configured to determine a first selection range based on a first color difference component value of a pixel of the image; and
a second determiner configured to determine a second selection range based on a second color difference component value of a pixel of the image,
the generating unit includes:
a first generator configured to generate a first corrected value for the first color difference component value of the target pixel by correcting the first color difference component values of pixels contained in the initial target region to reduce noise, the correction of the first color difference component values involving use of values falling within the first selection range from among the first color difference component values of the respective pixels contained in the initial target region; and
a second generator configured to generate a second corrected value for the second color difference component value of the target pixel by correcting the second color difference component values of pixels contained in the initial target region to reduce noise, the correction of the second color difference component values involving use of values falling within the second selection range from among the second color difference component values of the respective pixels contained in the initial target region, and the output unit includes:
a first output sub-unit configured to reduce noise from the enlarged target region based on the first corrected value of the target pixel and output an image represented by pixel values resulting from the noise reduction in terms of the first color difference components; and
a second output sub-unit configured to reduce noise from the enlarged target region based on the second corrected value of the target pixel and output an image represented pixel values resulting from the noise reduction in terms of the second color difference component;

the image processing device further comprising:
a calibrating unit configured to calibrate the first color difference component value of each pixel in the image to be output by the first output sub-unit and the second color difference component value of each pixel in the image to be output by the second output sub-unit, the calibration being made by applying norm processing to the first and second color difference component values.

7. The image processing device according to claim 2, wherein
the output unit is configured to:
specify, on the normal distribution representing the noise model of the image, a new reference range that is narrower than the reference range and having the corrected target pixel value as a new median;
determine, for each pixel contained in the enlarged target region, a new selection range based on the new median and the new reference range and in cooperation with the determination unit; and
perform noise reduction using values falling within the new selection range from among the values of the respective pixels contained in the enlarged target region.

8. An image processing method for an image processing device to correct pixel values of an image to reduce noise, the image processing method comprising:
a determining step of:
specifying, on a normal distribution representing a noise model of the image, a reference range having a value of a target pixel as a median;
computing, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median;
correcting one of the first sub-range and the second sub-range so that one of the sub-ranges in which a fewer number of pixels are distributed than in the other sub-range is narrower relative to the other sub-range; and
determining a selection range that is composed of the one of the first sub-range and the second sub-range as corrected and the other one of the first sub-range and the second sub-range as is; and
a generating step of generating a corrected value for the target pixel by correcting values of pixels contained in a target region to reduce noise, the target region being an image region subjected to noise reduction and at least containing the local region, and the value correction involving use of values falling within the selection range from among the values of the respective pixels contained in the target region.

9. An integrated circuit to be used in an image processing device that corrects pixel values of an image to reduce noise, the integrated circuit comprising:
a determination unit configured to:
specify, on a normal distribution representing a noise model of the image, a reference range having a value of a target pixel as a median;
compute, with respect to a local region that is an image region containing the target pixel, the number of pixels having a value falling within a first sub-range of the reference range and the number of pixels having a value falling within a second sub-range of the reference range, the first sub-range corresponding to larger values than the median and the second sub-range corresponding to smaller values than the median;
correct one of the first sub-range and the second sub-range so that one of the sub-ranges in which a fewer number of pixels are distributed than in the other sub-range is narrower relative to the other sub-range; and
determine a selection range that is composed of the one of the first sub-range and the second sub-range as corrected and the other one of the first sub-range and the second sub-range as is; and
a generating unit configured to generate a corrected value for the target pixel by correcting values of pixels contained in a target region to reduce noise, the target region being an image region subjected to noise reduction and at least containing the local region, and the value correction involving use of values falling within the selection range from among the values of the respective pixels contained in the target region.

10. An image processing device for correcting pixel values of an image to reduce noise, the image processing device comprising:
a first noise reduction unit configured to:
specify, on a normal distribution representing a noise model of the image, a first reference range having a value of a target pixel as a median; and
generate noise reduced pixel values by performing noise reduction processing on an initial target region that is an image region subjected to noise reduction and containing the target pixel, the noise reduction of the initial target region involving use of values falling within the first reference range from among values of respective pixels contained in the target region; and
a second noise reduction unit configured to:
specify, on the normal distribution representing the noise model of the image, a second reference range narrower than the first reference range and having, as a median, the noise reduced pixel value generated for the target pixel; and
generate noise reduced pixel values by performing noise reduction processing on an enlarged target region that is an image region subjected to noise reduction and at least containing the initial target region, the noise reduction of the enlarged target region involving use of values falling within the second reference range from among values of respective pixels contained in the target region.

* * * * *